(12) United States Patent
Turner

(10) Patent No.: US 8,106,315 B2
(45) Date of Patent: Jan. 31, 2012

(54) ENVELOPE WEIGHING APPARATUS WITH GRIPPING COMPENSATION FOR VARIABLE THICKNESS ENVELOPES

(75) Inventor: Bryan Turner, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 13/207,133

(22) Filed: Aug. 10, 2011

(65) Prior Publication Data

US 2011/0290569 A1    Dec. 1, 2011

Related U.S. Application Data

(60) Division of application No. 12/562,798, filed on Sep. 18, 2009, which is a continuation of application No. 11/855,130, filed on Sep. 13, 2007, now Pat. No. 7,687,727.

(60) Provisional application No. 61/101,995, filed on Oct. 1, 2008.

(51) Int. Cl.
*G01G 19/00* (2006.01)
*G01G 19/03* (2006.01)
*G01G 19/414* (2006.01)

(52) U.S. Cl. ......... 177/25.15; 177/145; 271/2; 271/272; 271/274; 705/406; 705/407; 705/414

(58) Field of Classification Search .............. 271/2, 272, 271/274; 177/25.15, 145; 705/406, 407, 705/414
See application file for complete search history.

(56) References Cited

U.S. PATENT DOCUMENTS

| 3,386,574 | A | 6/1968 | Kaplan |
| 3,648,839 | A | 3/1972 | Bradshaw |
| 3,805,904 | A | 4/1974 | Zimmerer |
| 3,834,474 | A | 9/1974 | Knol |
| 4,262,763 | A | 4/1981 | Raskin |

(Continued)

FOREIGN PATENT DOCUMENTS

EP    2 172 751 A1    9/2009

(Continued)

OTHER PUBLICATIONS

WIPOTEC Principle of Operation; retrieved from the internet on Sep. 13, 2007 at http://www.industrialcontroller.com/wipotec/operation.htm; 2 Pages.

(Continued)

*Primary Examiner* — Randy W Gibson

(74) *Attorney, Agent, or Firm* — Stolowitz Ford Cowger LLP

(57) ABSTRACT

Methods and apparatus for weighing an article, such as a mail piece, while the article is moving at high speed. An article (900) is received from an intake transport (1200), and gripped in a weighing station (1310), in between a capstan roller and a pinch roller (1316), which are synchronized to minimize slipping. A first precision servo system (1252, 1250) alters the speed of the article, and in the process acquires torque data for storage and analysis (1212, 1282). A second precision servo system (1260,1330) applies a constant force, via a tension arm (1320), urging the pinch roller (1316) against the capstan roller, independently of the thickness of the mail piece. Fourier analysis can conveniently be applied for analyzing the acquired current data and comparing to stored calibration data to determine weight. Weight is determined without regard to the actual speed of the moving article.

5 Claims, 17 Drawing Sheets

U.S. PATENT DOCUMENTS

| | | | |
|---|---|---|---|
| 4,461,363 A | | 7/1984 | Loy |
| 4,534,551 A | * | 8/1985 | Jones .......................... 271/275 |
| 4,696,358 A | | 9/1987 | Doerman |
| 4,916,391 A | | 4/1990 | Doerman |
| 5,019,991 A | | 5/1991 | Sansone et al. |
| 5,259,607 A | * | 11/1993 | Hironori et al. ........... 271/10.13 |
| 5,303,913 A | * | 4/1994 | Trouquilla .................... 271/274 |
| 5,308,932 A | | 5/1994 | Manduley |
| 5,393,939 A | | 2/1995 | Nasuta, Jr. |
| 5,465,662 A | * | 11/1995 | Keung et al. .................. 101/235 |
| 5,480,085 A | | 1/1996 | Smithe |
| 5,499,810 A | * | 3/1996 | Tranquilla .................... 271/274 |
| 5,524,878 A | * | 6/1996 | Trouquilla .................... 271/274 |
| 5,547,034 A | | 8/1996 | Wurz |
| 5,869,092 A | | 2/1999 | Hays |
| 5,879,000 A | | 3/1999 | Kakuta |
| 5,939,646 A | | 8/1999 | Fowler |
| 6,940,025 B1 | | 9/2005 | Salomon |
| 7,096,152 B1 | | 8/2006 | Ong |
| 7,241,955 B2 | | 7/2007 | Hebenstreit |
| 7,271,352 B2 | | 9/2007 | Rabindran |
| 7,297,879 B2 | | 11/2007 | Salomon |
| 7,550,681 B2 | | 6/2009 | Wang |
| 7,687,727 B2 | * | 3/2010 | Turner .............................. 177/1 |
| 7,820,923 B1 | | 10/2010 | Daboub |
| 7,838,781 B2 | | 11/2010 | Streder |
| 2005/0267848 A1 | | 12/2005 | Kenbeek |
| 2009/0071728 A1 | * | 3/2009 | Turner .............................. 177/1 |
| 2010/0006346 A1 | * | 1/2010 | Turner .............................. 177/1 |
| 2010/0082389 A1 | * | 4/2010 | Turner .......................... 702/175 |
| 2010/0282521 A1 | | 11/2010 | Turner |
| 2010/0294572 A1 | * | 11/2010 | Turner .............................. 177/1 |
| 2011/0004441 A1 | * | 1/2011 | Turner .......................... 702/175 |

FOREIGN PATENT DOCUMENTS

| | | |
|---|---|---|
| WO | 2007/031176 A1 | 3/2007 |
| WO | 2009/036251 A1 | 3/2009 |

OTHER PUBLICATIONS

International Searching Authority USPTO; International Search Report and Written Opinion; Jan. 7, 2009; 14 pages for PCT/US2008/076140.

European Patent Office, European Search Report for Application No. 09252332.3-2213, mail date Dec. 3, 2009.

* cited by examiner

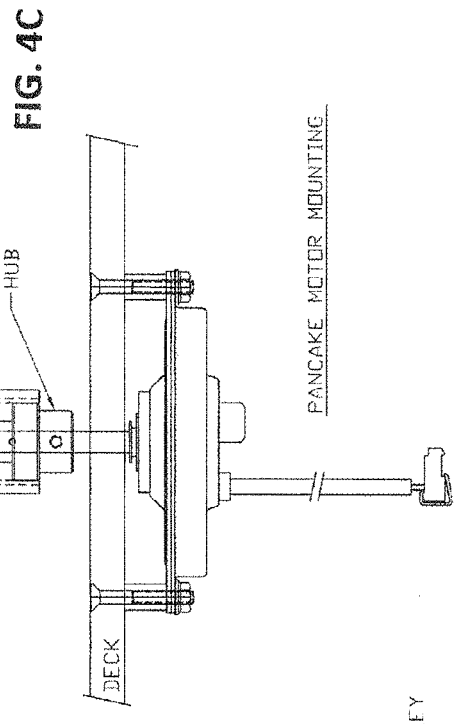
FIG. 4C
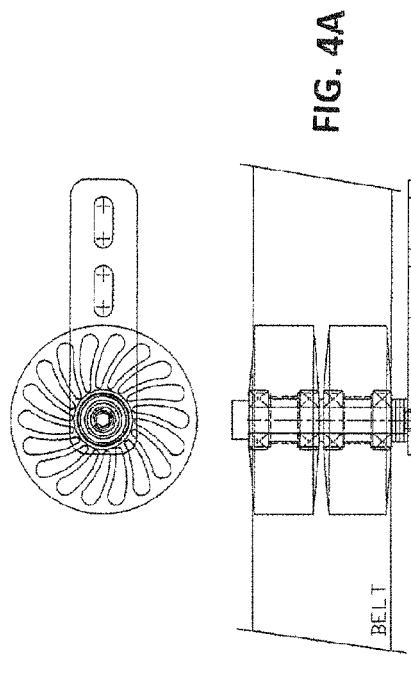
FIG. 4A
FIG. 4B

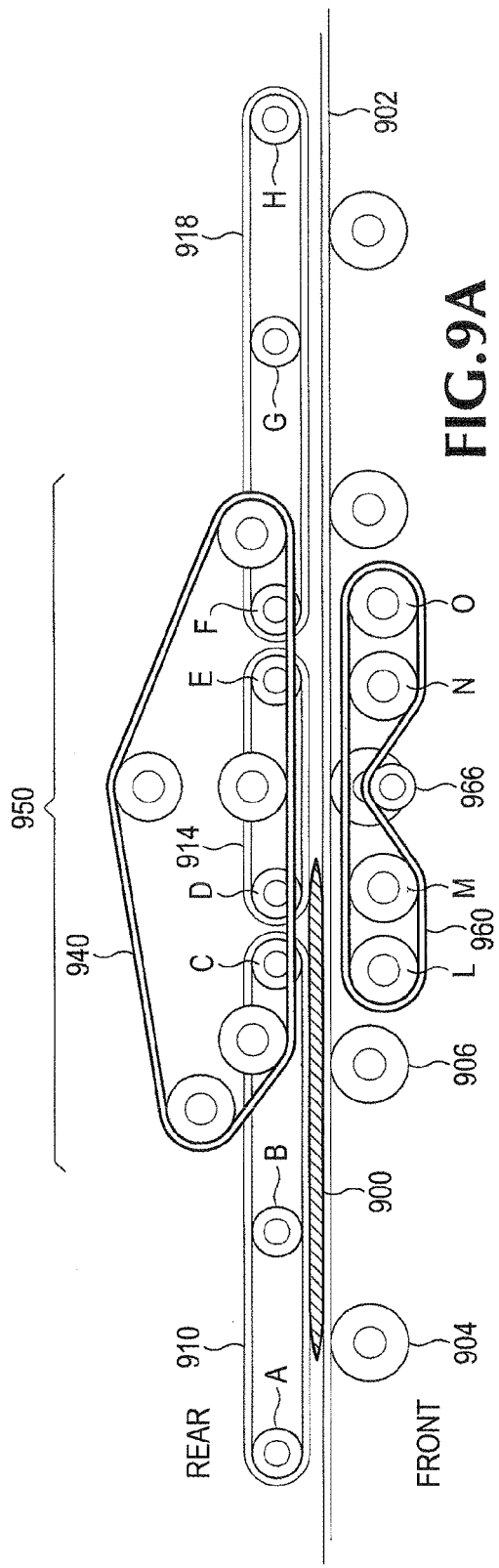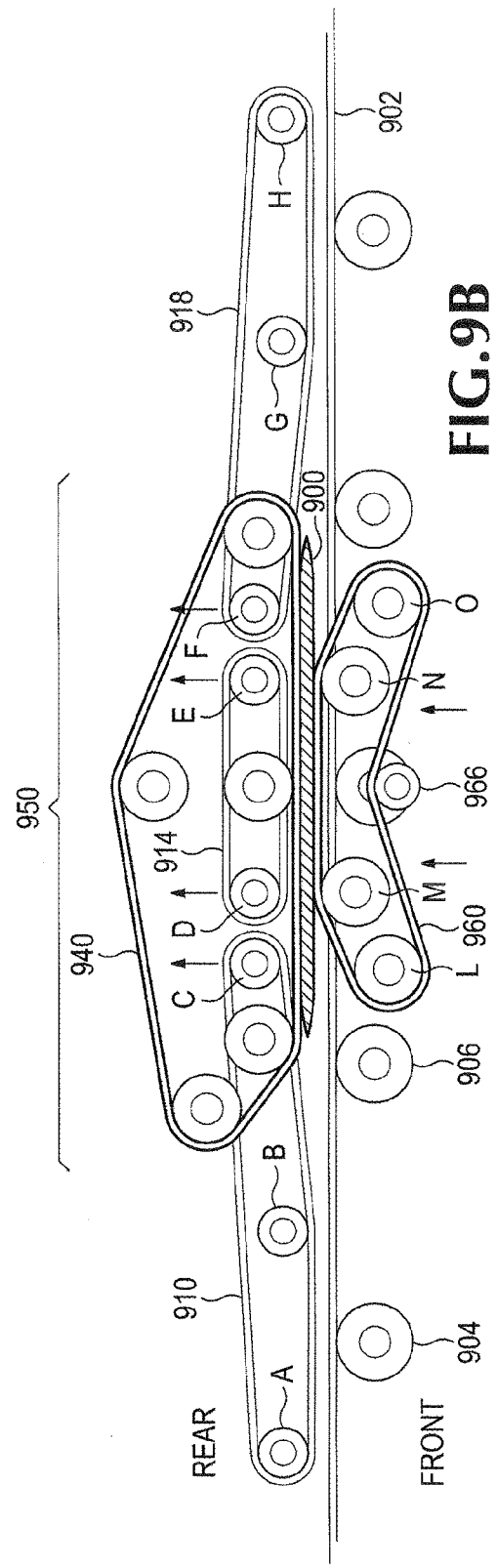

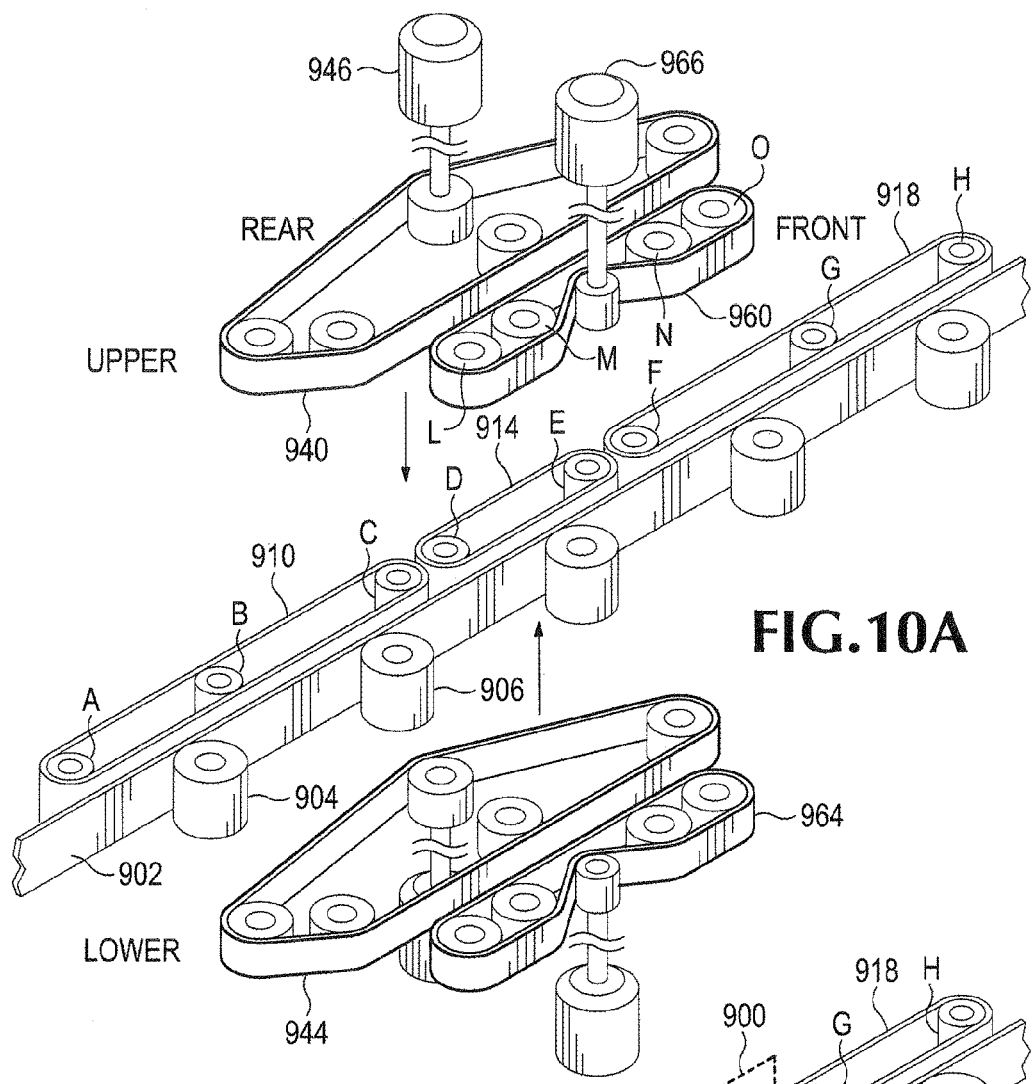
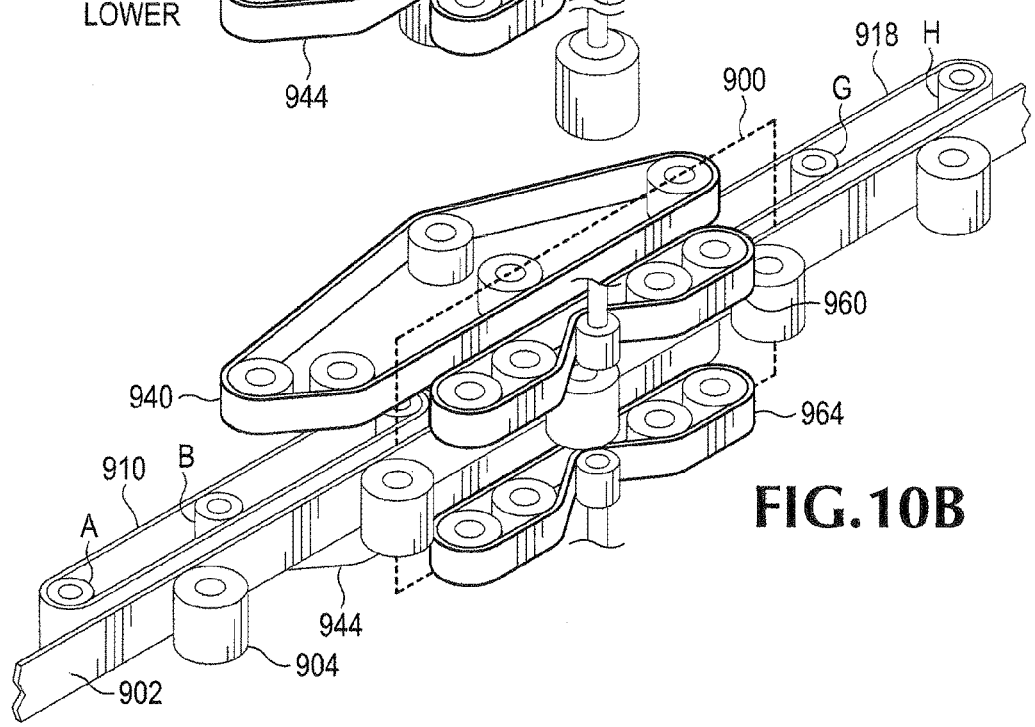

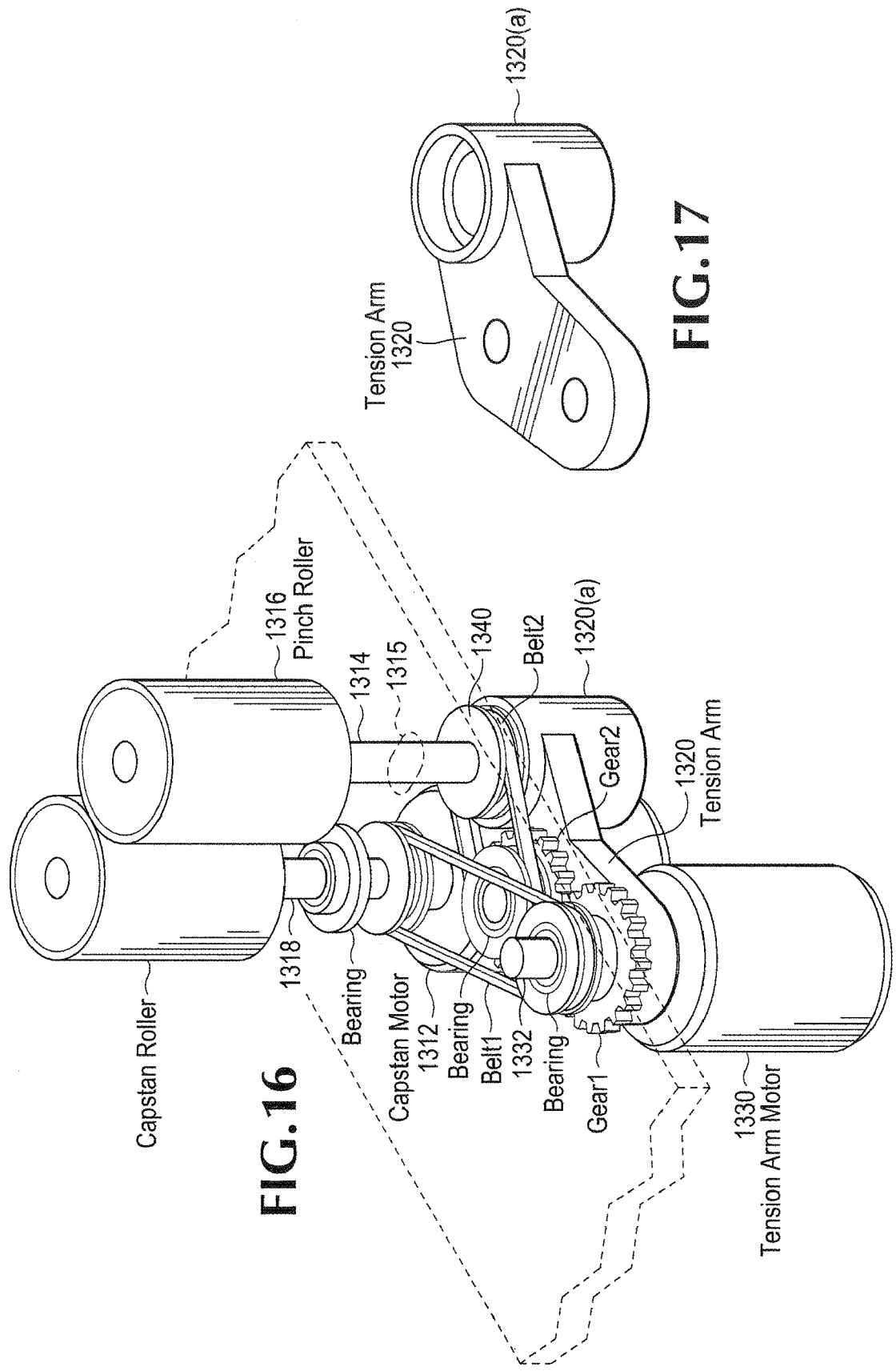

ENVELOPE WEIGHING APPARATUS WITH GRIPPING COMPENSATION FOR VARIABLE THICKNESS ENVELOPES

RELATED APPLICATIONS

This application is a divisional of co-pending U.S. application Ser. No. 12/562,798 filed Sep. 18, 2009, which is a continuation-in-part of U.S. application Ser. No. 11/855,130 filed Sep. 13, 2007, now U.S. Pat. No. 7,687,727, both of which are incorporated herein by this reference. U.S. application Ser. No. 12/562,798 is a non-provisional of U.S. Provisional Application No. 61/101,995 filed Oct. 1, 2008 and incorporated herein by this reference.

TECHNICAL FIELD

This invention pertains to methods and apparatus for accurately determining mass-related properties of an article, such as weight or moment of inertia, and more specifically it pertains to weighing articles that are in motion. In the case of mail pieces, another feature is ensuring that proper postage is paid.

BACKGROUND OF THE INVENTION

Many weighing systems are known, some dating back to biblical times. More recently, weighing systems have been developed for weighing each one of a stream of articles, such as mail pieces or parcels moving through a transport or mail sorting system. Prior art systems of that type are shown, for example, in U.S. Pat. Nos. 7,096,152 and 3,648,839.

Some known systems rely on back-EMF or "Electro Magnetic Force Restoration" principles. According to one vendor, "an applied load is compensated for by an electromagnetically produced counterforce. A precision position control (optical) keeps the system stable. The slightest movement is detected, initiates a feedback circuit to run current through a coil and causes the load to be returned to its original position. The coil current, which is proportional to the weight, is transmitted to an internal A/D converter then processed in the microprocessor."

The need remains for improvements in accuracy, speed (throughput), reduced cost, and reducing the need for frequent re-calibration of weighing systems. The present application achieves these and other goals by applying a dramatically different approach to the problem as further explained below.

Postal services typically charge for delivery of mail pieces by their weight, among other criteria. In general, the heavier the mail piece, the more is charged. Bulk mailers, who may mail thousands of pieces at a time, sometimes intermix heavier mail pieces with lighter ones, and put the postage appropriate for the lighter pieces on every piece. This can occur, for example, when a bank mails out its customer statements. Most statements contain a few sheets and easily fit under the one ounce cut-off, but some of them contain many sheets and are overweight. Very often the banks do not put proper postage on the heavier pieces.

Audits, sometimes run by manually weighing suspect mail pieces, indicate that the US Postal Service loses many millions of dollars each year because of this practice. Because current methods of weighing mail pieces are either too slow for existing sorting machines or require individual or a set of mail pieces to be weighed manually, postal services have not devised methods for ensuring proper postage on each mail piece. It is important to remember that postage applies to each mail piece, not to the average weight within a set of mail pieces. As a result, a set of mail pieces whose average weight is under the limit may still contain many mail pieces that are individually too heavy and require greater postage.

SUMMARY OF THE INVENTION

In one aspect, the present disclosure is directed to determining mass-related properties of articles "on the fly," i.e., as they move through a transport mechanism, by measuring an applied impulse required to move the article from one state to another. For example, an impulse can be applied to accelerate an article from a first velocity to a second (greater) velocity. That "impulse" can be applied through various electro-mechanical contrivances such as a motor. The magnitude of the impulse can be measured in various ways. In one embodiment, an impulse is measured indirectly by monitoring the torque applied through a servo motor to accelerate the article. In the detailed description below, we discuss mainly "weighing" of articles, but other embodiments and applications within the scope of the present disclosure can be arranged to measure mass-related article properties such as moment of inertia as well. Further, much of what follows discusses a straight-line movement of the article, but a rotational or other system of movement is also within the purview of the present disclosure.

In one class of embodiments, an article whose mass-related property is to be measured is presented, for example by entering a "weighing station" via a transport mechanism such as a belt transport. Details of such transport mechanisms are well known in various contexts, including mail sorting machines. In alternative embodiments, the weighing apparatus might be used separately, for example in a machine arranged to apply the correct postage to a mail piece. In still other applications, the weighing apparatus may be used to provide rapid, accurate weighing of articles or materials, such as chemicals, pharmaceuticals or other substances unrelated to postal services. The concept of the present invention is applicable over a wide spectrum of applications.

In general, a weighing apparatus in accordance with the present disclosure receives an article that has a measured or otherwise known initial state of movement (or rest). There is also a predetermined or "commanded" final state of movement (or rest) of the article. And finally, a mechanism is provided that applies an impulse to move the object from its initial state to the commanded final state. (The term "mechanism" is used in this application in a broad sense. It is not limited to purely mechanical contrivances; to the contrary, it refers to any and all mechanical, electrical, optical, electro-mechanical systems, software controlled systems, and combinations thereof that provide the described functionality.)

The impulse-applying mechanism must include or be coupled to some means of measuring or capturing information as a proxy for the actual impulse. In other words, the impulse typically is measured indirectly. For example, a curve of the torque that applies the impulse through a motor can be used to infer sufficient information about the applied impulse. The measured proxy is then calibrated by articles of known mass-related properties and the calibrated values are used to determine the article's mass-related properties. The use of calibration is an important part of the system because it allows considerable simplification to take place. As explained below, in a preferred embodiment, this approach obviates the need for actual or absolute measurements such as article velocity. Indeed, velocity is not critical and need not be measured in absolute terms. One primary improvement of the present invention over prior art is that it allows weighing of articles at normal transport speeds; for example, hundreds of inches per second for mail pieces.

Another aspect of the present invention comprises a system for measuring the weight of each mail piece in a stream of mail pieces, determining the proper postage for that mail piece, determining the amount of postage paid by the mailer, and segregating out mail pieces with improper postage. The proper amount of postage may be based on the mail piece's weight, size, thickness, mailing point, delivery point, or other property, alone or in combination. Another aspect of the invention comprises a method for ensuring that proper postage has been paid for each mail piece.

Additional aspects and advantages of this invention will be apparent from the following detailed description of preferred embodiments, which proceeds with reference to the accompanying drawings.

BRIEF DESCRIPTION OF THE DRAWINGS

FIG. 4A comprises top view and cross-sectional views of an adjustable pinch roller assembly for use in the transport apparatus of FIG. 2.

FIG. 4B is a cross-sectional side view of a pivot roller assembly of a type useful in the weigh station of FIG. 2.

FIG. 4C is a side view of a pancake motor mounting in the article transport apparatus of FIG. 2.

FIG. 9A is a top plan view of a transport assembly of a second embodiment of an in-line weighing apparatus in a non-weighing state.

FIG. 9B is a top plan view of the transport assembly of FIG. 9A in a weighing state.

FIG. 10A is an exploded, perspective view of the transport assembly of FIG. 9A.

FIG. 10B is an assembled, perspective view of the transport assembly of FIG. 9A.

FIG. 16 is a perspective view of the weighing assembly with the deck shown in phantom.

FIG. 17 is a perspective view of a tension arm standing alone.

DETAILED DESCRIPTION OF PREFERRED EMBODIMENTS

Figure 1:
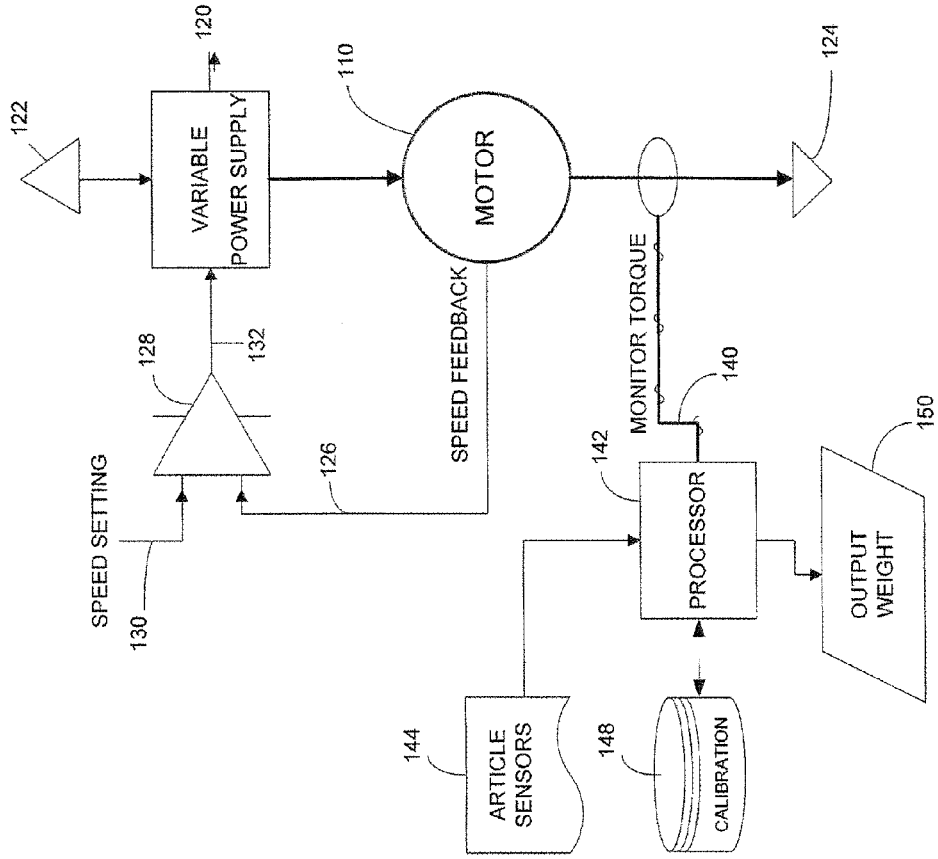
FIG. 1 is a simplified electrical schematic diagram illustrating one embodiment of a system for weighing articles on the fly.

Turning now to FIG. 1, a simplified electrical schematic diagram is shown illustrating one embodiment of a system for weighing articles on the fly. In FIG. 1, a servo motor 110 is driven by a variable power supply 120 which is coupled to a power source 122. In operation, current flows through the motor to ground 124. A speed sensor (not shown) is coupled to the motor 110 to provide a speed feedback signal 126. Various sensors can be used such as shaft encoders, optical sensors, etc. to accurately monitor speed or rotation of the motor 110. The speed feedback signal is provided to an error amplifier 128, such as an op-amp, which compares the current speed to a predetermined input speed setting 130. An error signal 132 related to the difference between the two inputs is input to the power supply 120 to control the motor current through 110 so as to maintain the motor speed at the speed setting 130 in the steady state. A change in the load on the motor, however, will result in a transient in the motor torque indicative of that change in loading. That transient torque level may be captured as a proxy indicative of an impulse applied to the article.

Still referring to FIG. 1, the motor torque is monitored and a motor torque signal 140 related to the monitored torque level, for example a digital stream of samples, is input to a processor 142. This is not necessarily a stand-alone processor, but it may be any programmable digital processor, or a software component arranged to implement the described functionality on a dedicated processor or as part of a larger system. Article sensors 144, for example optical sensors (photodiodes, etc.), detect when each article of interest enters and leaves the weigh station, as further explained below with reference to other figures. A calibration data store 148 stores calibration data, which can include steady-state or "no load" measurements, taken when no article is present, as well as data taken from measurement of articles having known mass. This data is used by the processor 142 to determine the article weight, and the result is output, for example displayed, printed, or stored in digital file, as indicated at 150 in the drawing.

Figure 2:
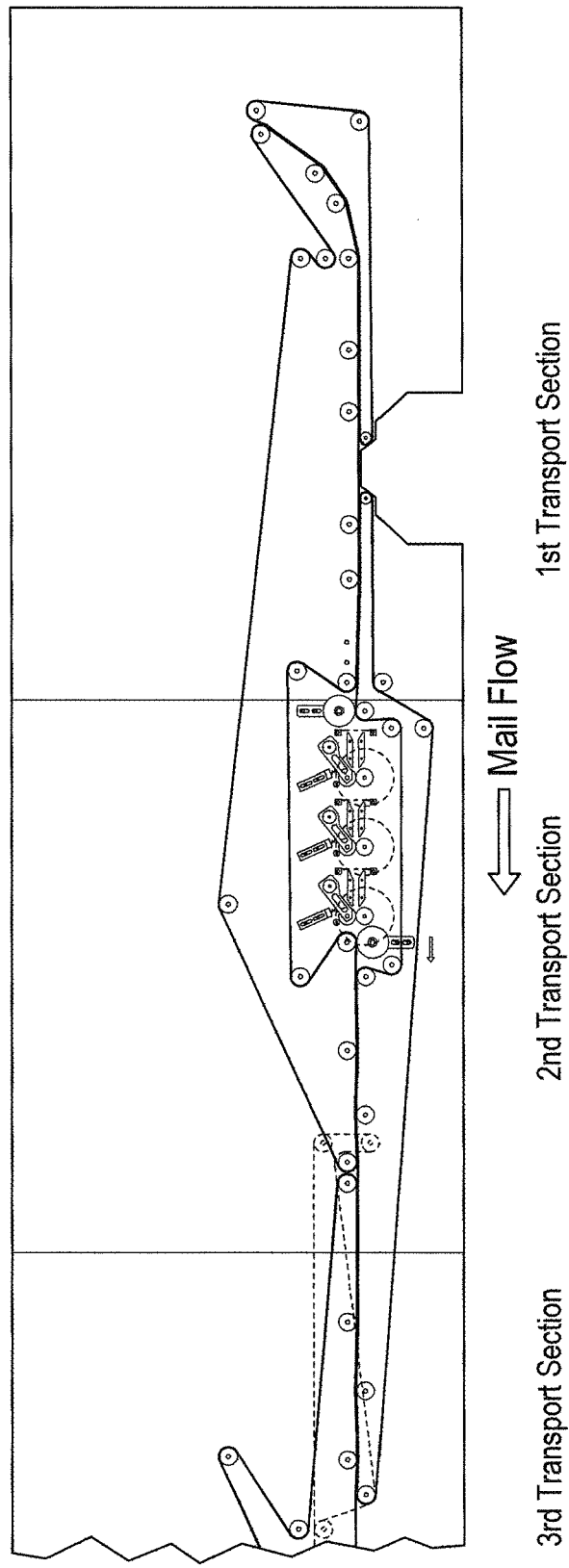
FIG. 2 is a mechanical drawing in top view of an article transport apparatus including a weigh station in accordance with one embodiment of the present invention.
Figure 3:
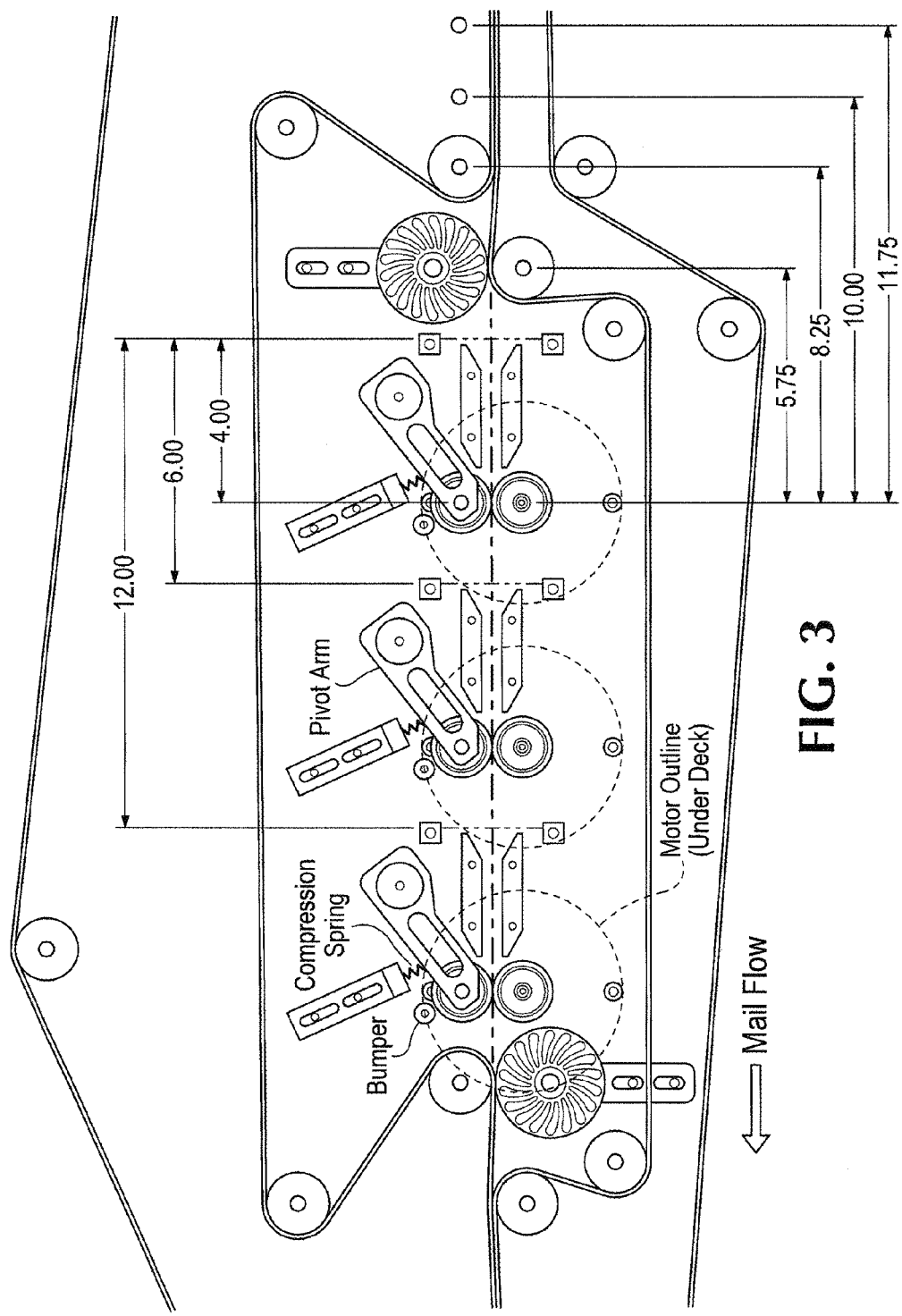
FIG. 3 is a mechanical drawing in top view showing greater detail of the weigh station of FIG. 2.

FIG. 2 is a mechanical drawing in top view of a belt-driven article transport apparatus. In operation, articles move from right to left in the drawing, from a first transport section, into a second transport section (where a weigh station will be implemented as described below), and thence to a third or output transport section on the left. FIG. 3 is a mechanical drawing in top view showing greater detail of the second transport section of the apparatus of FIG. 2. Referring to FIG. 3, articles enter from the right through a variable pinch roller pair, past a first photosensor, between a pair of fixed non-friction guides, and into a first motor assembly. The first photo sensor, together with second and third photo sensors described below, generally correspond to the article sensors 144 of FIG. 1. The first motor assembly comprises a motor driven hub, and an opposing spring-loaded pinch roller mounted on a pivot arm, controlled by a solenoid (not shown), for controllably moving the opposing roller into contact or near contact with the said hub so as to form a pinch roller pair for engaging the moving article. The first motor operates at the same speed as the belt-driven first transport section to normalize the speed of the article for articles of different lengths. Accordingly, each article enters the second transport section at the same speed. The actual or absolute value of that speed is not critical for present purposes. In contradistinction to prior art, the present system does not rely on speed measurements.

A second photo sensor detects movement of the article from the first section into the second section. The second section comprises a second motor assembly, similar to the first section. However, in accordance with the present invention, the second section is modified by replacing the common DC brush motor with a precision servo system further described below. FIG. 4A comprises top view and cross-sectional views of one example of an adjustable pinch roller assembly for use in the transport apparatus of FIG. 2. FIG. 4B is a cross-sectional side view of a pivot roller assembly of a type useful in the weigh station of FIG. 2. FIG. 4C is a side view of a pancake motor mounting in the article transport apparatus of FIG. 2.

Figure 5:
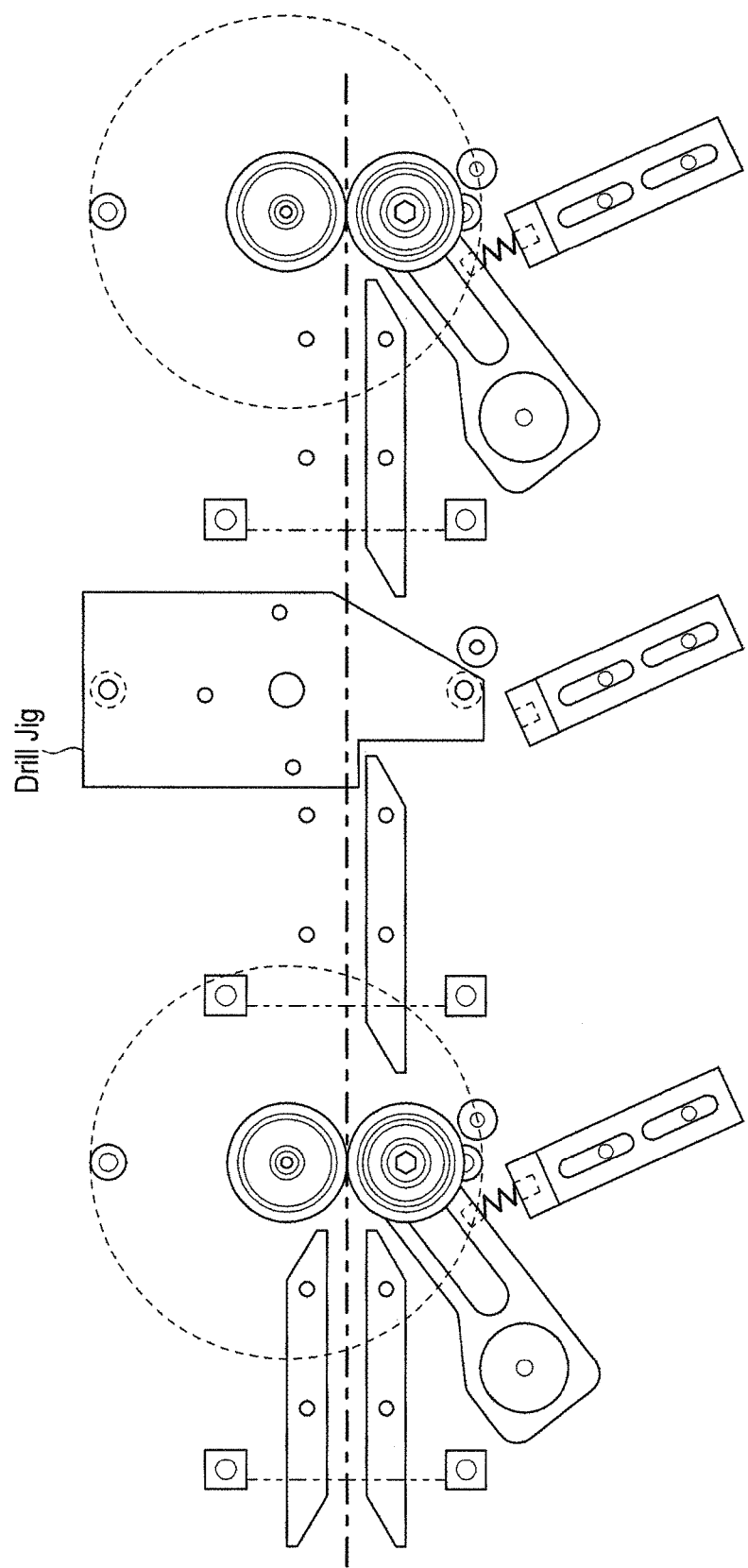
FIGS. 5-6 are mechanical drawings in top view illustrating a procedure for replacing a pancake motor with a precision servo motor in the assembly of FIG. 2.
Figure 6:
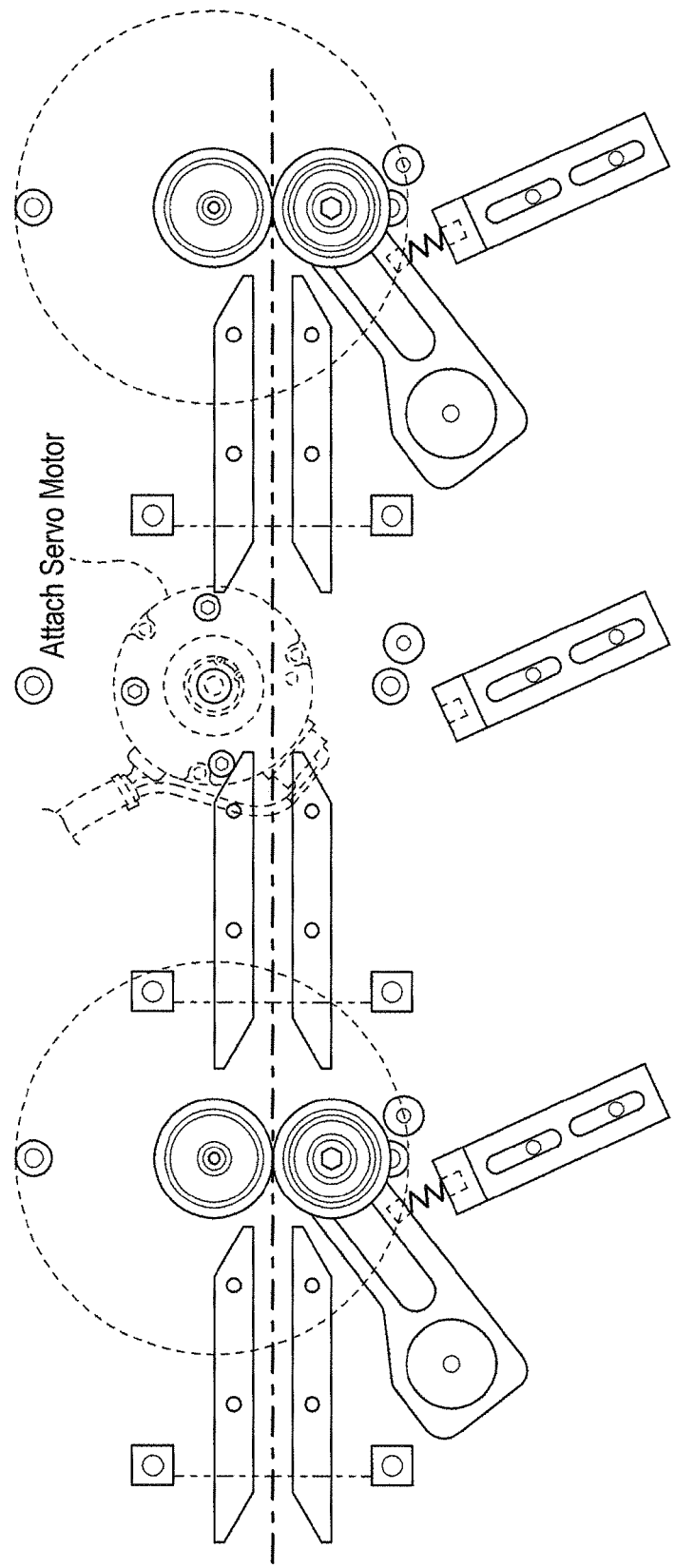
Figure 7:
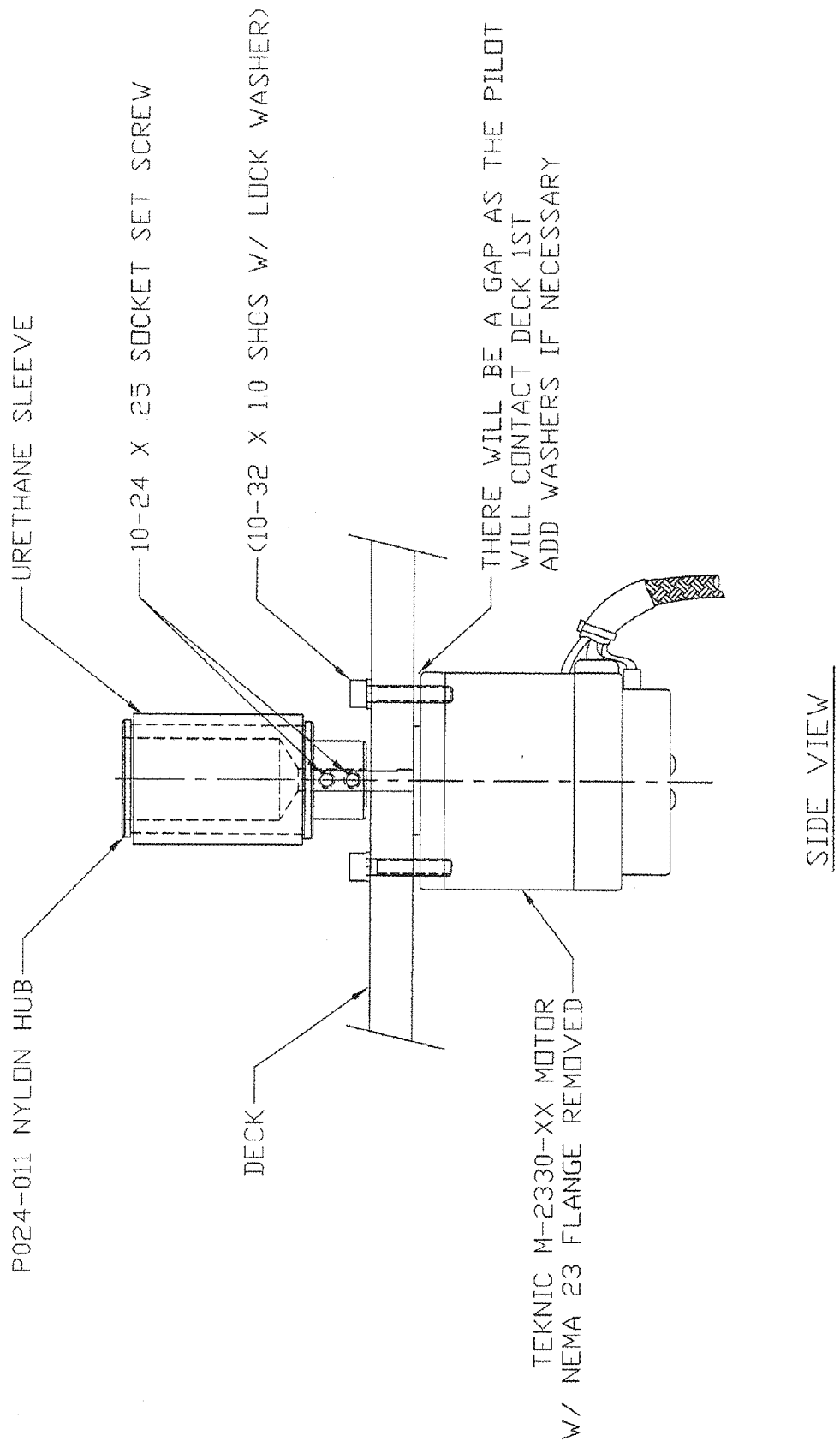
FIG. 7 is a side view illustrating a precision servo motor installed below a transport deck of a transport assembly with a sleeved hub installed for engaging an article moving through the transport assembly.

FIGS. 5-6 are mechanical drawings in top view illustrating a procedure for replacing a pancake motor with a precision servo motor in the assembly of FIG. 2. The Teknic model M-2330 motor is just an illustrative example of such a servo motor. Other precision motors can be used and should be considered equivalents. FIG. 7 is a side view illustrating a precision servo motor installed below a transport deck of a transport assembly with a sleeved hub installed for engaging an article moving through the transport assembly. Now we assume such modifications have been done, as described in the drawing, so that the second section motor assembly now employs a servo system in lieu of the pancake type motor used in the first and third transport sections. A third photo sensor detects movement of the article from the second section into the third section. The third transport section (see FIG. 2) re-establishes the article speed to the system belt speed after weighing.

Accordingly, in one embodiment, a transport mechanism (first section) projects an article at some initial velocity into the measuring apparatus. For example, in mail piece handling, a belt driven transport mechanism is commonplace. That velocity is known to the system itself (for such things as spacing the articles along their route), but its value is not important and indeed is neither calculated nor used in the process of weighing the article. This ignorance by the weighing mechanism of the initial velocity of the article is material, since much of the prior art measures mass by calculating the difference between initial and final velocities of the article. Since the initial velocity is not provided to the weighing apparatus, such approach is precluded.

In one embodiment (see below for others) the article then enters a measuring apparatus which pinches the article between two rollers. In the illustrative example in the drawings, the "measuring apparatus" generally corresponds to the second transport section, also referred to as a weigh station. The measuring apparatus has been commanded to output the article at a second velocity (which may be higher or lower than the input velocity). This corresponds to the speed setting 130 of FIG. 1. The pinch rollers are driven by a servo mechanism (see FIG. 1) that measures the angular velocity of a motor that drives one of the rollers, compares it to the desired angular velocity (at which the article would be moving at the ordered output velocity), and supplies sufficient torque to achieve the desired final angular velocity. The specific profile of intermediate velocities ordered for or achieved by the system are unimportant, though the proposed system includes devices that accelerate and then decelerate the article (or the other way around) so that its final velocity may be the same as its initial velocity. So, for example, the weigh station may first accelerate, and then decelerate the article, arriving at the same velocity as the initial velocity, but gathering torque data in the meantime.

The solenoids that operate the pinch roller pivot arms are controlled so that, while an article is in the second section (weigh station), as detected by the photo sensors, the first and third transport section rollers are withdrawn from the motor hubs so that the weigh station pinch roller assembly supports the article. In this way, acceleration and deceleration of the article are accurately reflected in the servo loop that drives the weigh station servo motor.

It is important to state that it does not matter what that final angular velocity is. Unlike prior system, such as those disclosed on U.S. Pat. No. 7,096,152 or 3,648,839, the proposed system makes no absolute measurements at all. It works on calibration of torque, not absolute measurements of current or velocity.

The application of a precision instrument grade servo system to the problem of weighing mail pieces or parcels while they are moving at a high speed enables multiple approaches to mass calculation. In a preferred embodiment, the servo mechanism is in continuous communication and control of all of the moving roller system components prior to introduction of the item to be weighed. In this way a state of nominal motion or equilibrium can be established and related to the zero state of the scale. (Recall zero state data can be stored in data store 148 of FIG. 1.) Upon introduction of the subject article (which may be a mail piece, a parcel, or other object), this equilibrium is disturbed.

The servo mechanism, by way of electronic and mechanical feedback loops, rapidly responds by injecting correcting signals to re-establish the nominal motion state. By measuring the error-correcting signals generated by the servo system and scaling by a calibration factor, a mass calculation can be made. Other methods of using servo data are described later.

Since much of the prior art discusses calculating the weight (mass) of the articles, it bears mentioning here that the proposed system can work quite well with no actual calculation of article mass at all. All that really matters is the comparison of the mass-related property of the article to the mass-related properties of one or more calibration articles. Experimental data from a prototype is discussed later.

Other embodiments include but are not limited to the following:

Maintaining a state of angular momentum associated with the nominal zero state and then measuring the incremental torque required to re-establish the velocity of the nominal zero state but now including an incremental mass (e.g. a mail piece).

Maintaining a nominal zero state of motion with an associated constant torque and then measuring the difference in angular displacement of the rotating components when an incremental mass is introduced. The difference in angular displacement is compared between the zero and the loaded state over equal and fixed time intervals or over intervals whose ratio is known to the system.

Maintaining a nominal zero state of motion with an associated constant torque and then comparing the time differential required to attain a fixed displacement.

Introducing an acceleration command and then measuring the torque differential required to maintain that acceleration.

The normal friction forces on the motor and roller system will introduce a negative acceleration on the system mass if a sustaining torque does not counter it. Since the friction force is constant, when an incremental mass is introduced, the system will have a different acceleration in the absence of a sustaining torque. Since the friction force is constant, the differential acceleration would tend to be smaller for a larger mass. Therefore the torque required to maintain the velocity of the now increased system mass would also be different. We can measure this incremental torque and compare with that of the zero state of the system and also with a calibration factor to scale the measurement.

Non-linear relationships between the mass-related property of the article and the measured property are also envisioned by the proposed system. In such a case sufficient calibration is required as to adequately define the relationships. It is not a requirement in every embodiment that the article be propelled by a transport mechanism. It can for example, be self-propelled. In one embodiment, the object is a truck which moves at some measured velocity into the weighing apparatus. One possible system use is sorting the objects, such as mail pieces, into bins based on their determined weight (though this sortation is not a requirement of the proposed system). Another use may be to assess taxes based on vehicle weight (for, say, a truck).

FIG. 9A is a top plan view of a transport assembly of a second embodiment of an in-line weighing apparatus in a non-weighing state. This type of transport assembly may be integrated along a transport track of an automatic mail piece sorter machine, or the like, or may be implemented in a stand-alone weighing machine. In general, a mail piece 900 travels from left to right in the drawing. In FIG. 9A the mail piece 900 is engaged between main transport belts 910 and 902 which move synchronously at a predetermined system transport speed. This may be, for example, on the order of 150 inches per second. Belt 902 may be driven and or guided by rollers 904, 906 etc. The left transport belt 910 may be driven and or guided by rollers marked A, B and C for reference.

The left transport belt 910/902 conveys the mail piece 900 into a weighing station 950, further described below. After weighing, the mail piece proceeds to exit the weighing station 950 by engagement in between right transport belt 918 and belt 902, again moving at the system transport speed. The right belt 918 is guided and or driven by rollers F, G and H as shown. These various belts are shown also in an exploded view in FIG. 10A. In the weighing station 950, the mail piece 900 changes speed, perhaps more than once, but it does not stop. This example has the advantage of maintaining a two-sided pinch to control mail pieces as they travel through the system.

Turning now to the weighing station 950 in FIG. 9A, a front weigh belt 960 is shown, driven by a motor 966 around a series of guide rollers L, M, N and O. The front weigh belt 960 is spaced apart from the mail piece 900 in the non-weighing state shown in FIG. 9A. A rear weigh belt 940 is entrained on a series of guide rollers, generally as indicated, so that belt 940 also is spaced apart from the path of the mail piece 900 in this non-weighing state. The weigh belts 940, 960 are spaced apart from the transport belts 902, 910, 914, 918 in the dimension into the page, so they do not conflict, as seen in the exploded view of FIG. 10A. ("Front" and "rear" are arbitrary labels in this description.)

FIG. 9B is a top plan view of the transport assembly of FIG. 9A in a weighing state. In this state, the mail piece 900 has entered the weigh station 950. The mail piece is disengaged from the transport belts as the transport belts are repositioned into a weigh state spaced apart from the mail piece. To do so, guide rollers C, D, E and F are moved up as shown by the small arrows in FIG. 9B. Consequently, belts 910, 914 and 918 do not contact the mail piece at this time. Rather, the mail piece is now in contact with the rear weigh belt 940. In the lower portion of the drawing, the lower transport belt 902 is not affected. Rather, in the weigh state, the front weigh belt 960 is repositioned to contact the mail piece, so that the mail piece is gripped in between the front and rear weigh belts only. To reposition the front weigh belt guide rollers M and N are moved upward, as indicated by the small arrows in the drawing. The belt 960 thus moves the mail piece temporarily off of the transport belt 902 as further explained below.

The weigh belts are synchronized to the same speed, for example 250 inches per second, which represents acceleration from the transport belt speed (150 ips in the example). The weigh belts should be coupled to a precision servo motor so that motion of the weighing belts translates to a corresponding rotation of the motor, and vice versa. In other words, there should be little or no slippage between the servo motor and the weighing belts. A separate motor may be coupled to each belt, as long as the motors and respective belts are synchronized, or a single motor may be used. Two motors are shown in the illustrated embodiment.

An example of a suitable servo motor is commercially available Teknic model M-2330. This is an instrument grade, brushless AC servo motor with integrated encoder. Peak torque is on the order of 160 ounce-inches. Other precision motors can be used and should be considered equivalents. A high power density motor is preferred for building a weighing system into a confined space. The shaft encoder may provide, for example, on the order of 4,000 to 8,000 counts per revolution.

As mentioned, FIG. 10A is an exploded view of the transport assembly of FIG. 9A. In this view, a motor 946 drives the rear weigh belt 940. A second motor 966 drives the front weigh belt 960. A second ("lower") set of front and rear weigh belts, 964 and 944, respectively, are shown below the transport belts 902 etc. These operate in the same manner as the upper weigh belts 960, 940 as described. They should be synchronized to the upper weigh belts, and may share common drive and control elements. This may be termed an interleaved belt system, in that the weigh belts are above and below the transport belts.

FIG. 10B is an assembled, perspective view of the transport assembly of FIG. 9A. Here is can be seen that the upper weigh belts (940,960) are located above the transport belts, and the lower weigh belts (are located below the transport belts. All three pairs of belts are sized and spaced for engaging the mail piece 900—shown in dashed lines—at the appropriate times.

In operation of the assembly of FIGS. 9 and 10, a mail piece 900 is conveyed from left to right (FIG. 9A), initially by the transport belts. The intake transport belts are moving at a predetermined initial velocity, for example the system transport speed in a sorter system, and thus the mail piece enters the weigh station at that initial velocity. Since the mail pieces may vary in length, for example from 5 inches to 11.5 inches, short pieces would otherwise slow down before they hit the main rollers (weigh station) and produce a erroneous reading.

To avoid that result, the first pair of belts maintains the velocity of these pieces, and then releases just as the piece reaches the main rollers.

Accordingly, when the mail piece arrives in the weigh station 950 (as detected, for example, by photo sensors described later), the piece is released from the transport belts, and substantially immediately gripped in the upper and lower weigh belts (FIG. 9B), by the actions described above. This process may be enabled by a control system similar to the one described below.

In the weigh station, the piece may be accelerated and or decelerated by the servo motor as discussed earlier to accomplish a weighing operation. The weigh belts thus change speed to make the measurement; the transport belts preferably operate at constant speed. The piece then exits the weigh station, continuing to move from left to right in FIG. 9, essentially by reversing the above actions. That is, the assembly switches from the weigh state back to the non-weigh state. The weigh belts are disengaged from the mail piece, and substantially immediately the transport belts re-engage the mail piece. The mail piece may be restored to the initial velocity. In this way, a series of mail pieces may move through the weighing station, and be weighed "in-line" without affecting a larger system in which the weighing apparatus may be installed. Below we describe in more detail how the weight measurements are electronically acquired.

Figure 11A:
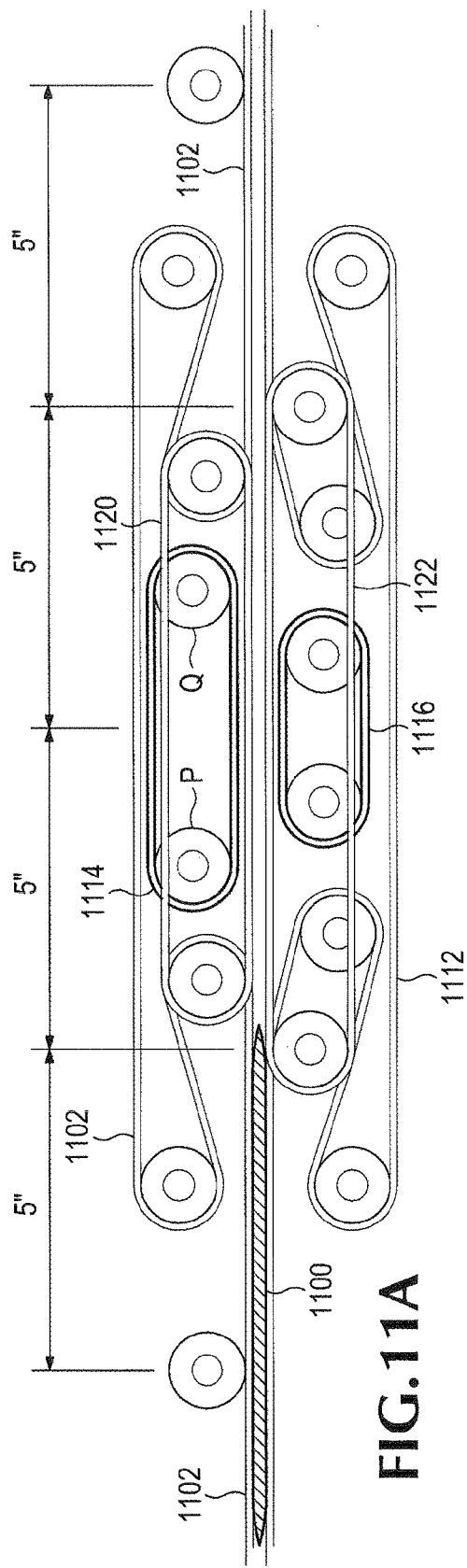
FIG. 11A is a top plan view of a transport assembly of a third embodiment of an in-line weighing apparatus in a non-weighing state.

FIG. 11A is a top plan view of a transport assembly of a third embodiment of an in-line weighing apparatus in a non-weighing state. Front and rear primary transport belts 1112 and 1102, respectively, convey a mail piece 1100 from left to right in the drawing. The mail piece is gripped in between them, as shown, prior to weighing, and after weighing. In this example, dimensions at 5-inch intervals are shown, based on an expected five-inch minimum mail piece length.

A second pair of transport belts 1122 front and 1120 rear, are arranged to convey a mail piece, also at normal transport belt speed, when the system is not performing a weighing operation. The second transport belts 1122, 1120 are spaced above the primary transport belts (as well as the weigh belts), as best seen in the exploded perspective view of FIG. 11C. The second transport belts "bridge the gap" in the non-weighing state from the primary transport belts at the intake (left) side to the same belts at the output (right) side as the primary transport belts are routed around the weigh station. This embodiment ensures that even a 5-inch envelope is pinched between two belts at all times.

A third pair of transport belts 1130, 1132 (FIG. 11C) are sized and arranged like the second pair, but are instead located below the primary transport belts. In other words, these belts are interleaved, as best seen in the exploded view of FIG. 11C. That is, the second pair of transport belts 1120, 1122 are located above the primary transport belts, while the third pair of belts 1130, 1132 are located below the primary transport belts 1102, 1112. All three pairs of belts are sized and spaced for engaging the mail piece 1100 at the appropriate times (and not during actual weighing of the mail piece). The total height of the three belts, plus spacing, would be similar to the minimum expected height of a mail piece, for example a 3½ inch minimum for a standard letter. A pair of weighing belts 1114, 1116 are spaced apart from the transport belts and not contact the mail piece in this non-weighing state (FIG. 11A).

Figure 11B:
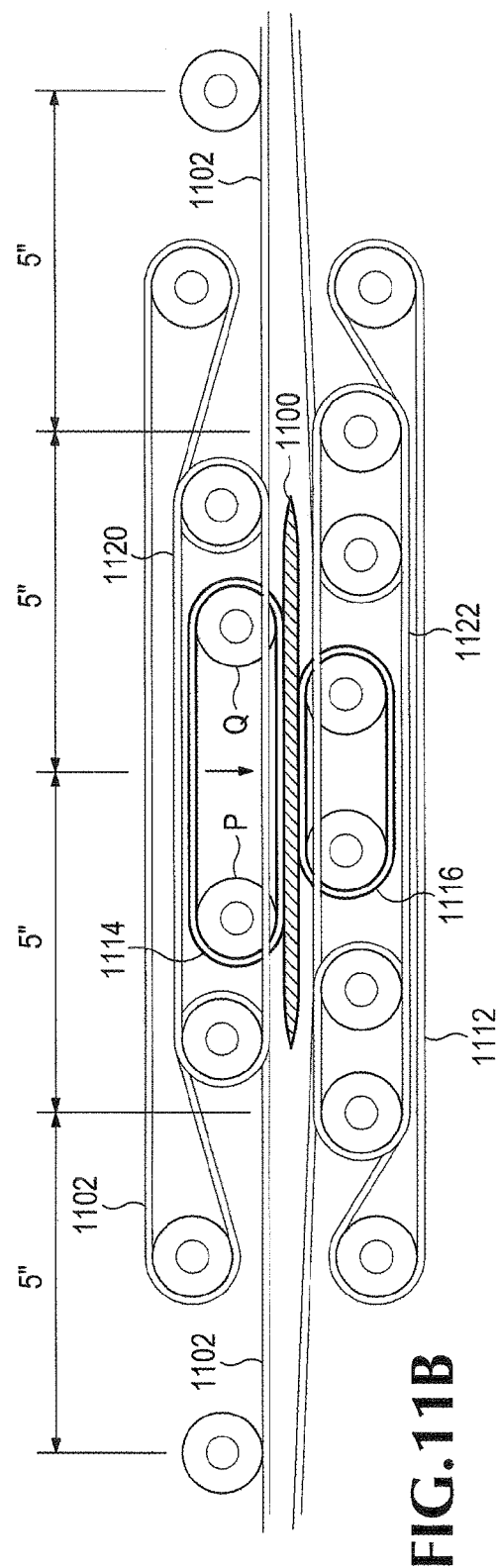
FIG. 11B is a top plan view the a transport assembly of FIG. 11A in a weighing state.
Figure 11C:
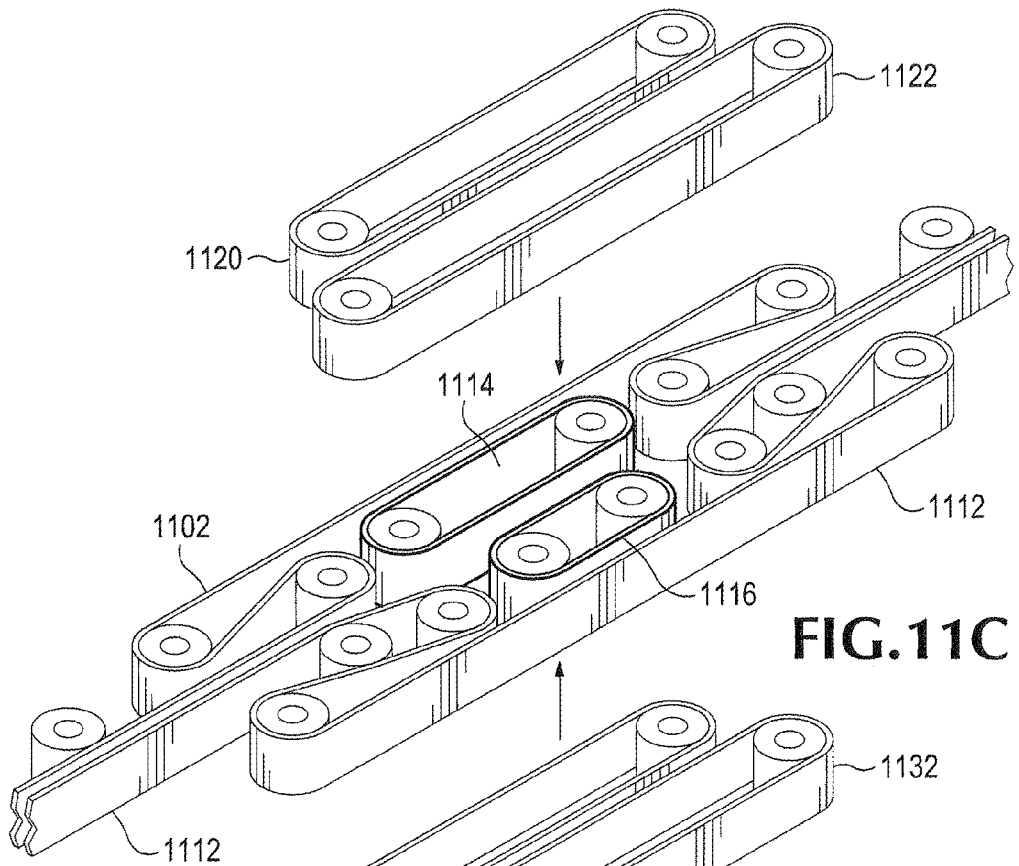
FIG. 11C is an exploded, perspective view of the transport assembly of FIG. 11A.
Figure 11D:
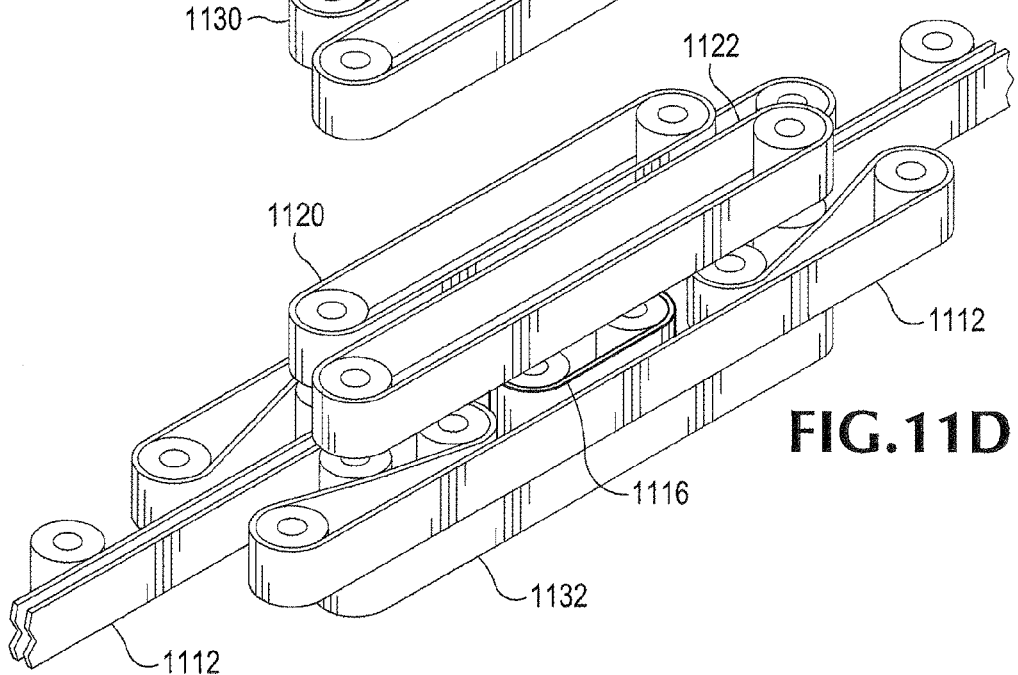
FIG. 11D is an assembled, perspective view of the transport assembly of FIG. 11A.

FIG. 11B is a top plan view of the transport assembly of FIG. 11A in a weighing state. The mail piece 1100 has moved into the weighing station. The mail piece is released from the primary transport belts, and also released from the second and third pairs of transport belts. The mail piece is now gripped between the weighing belts 1114, 1116 for weighing "on the fly" i.e., without stopping its travel. To do this, rollers P and Q are repositioned to relocate the rear weigh belt 1114, as indicated by two small arrows, to bring the belt 1114 into contact with the mail piece. This also brings the opposite face of the mail piece into contact with the stationary front weigh belt 1116. The mail piece no longer contacts any of the transport belts. Weighing is conducted as the mail piece moves along gripped in between the weigh belts. As before, the weigh belts are coupled to a suitable, precision servo motor.

The piece then exits the weigh station, continuing to move from left to right in FIG. 11, essentially by reversing the above actions. That is, the assembly switches from the weigh state back to the non-weigh state. The weigh belt 1114 is disengaged from the mail piece, and consequently the transport belts re-engage the mail piece. In particular, depending on the size of the mail piece, the second and third transport belts ensure that the piece moves along into re-engagement with the primary transport belts 1102, 1112 on the exit (right) side of the assembly. The mail piece may be restored to its initial velocity. FIG. 11D shows the transport assembly in an assembled, perspective view, without a mail piece.

Figure 12:
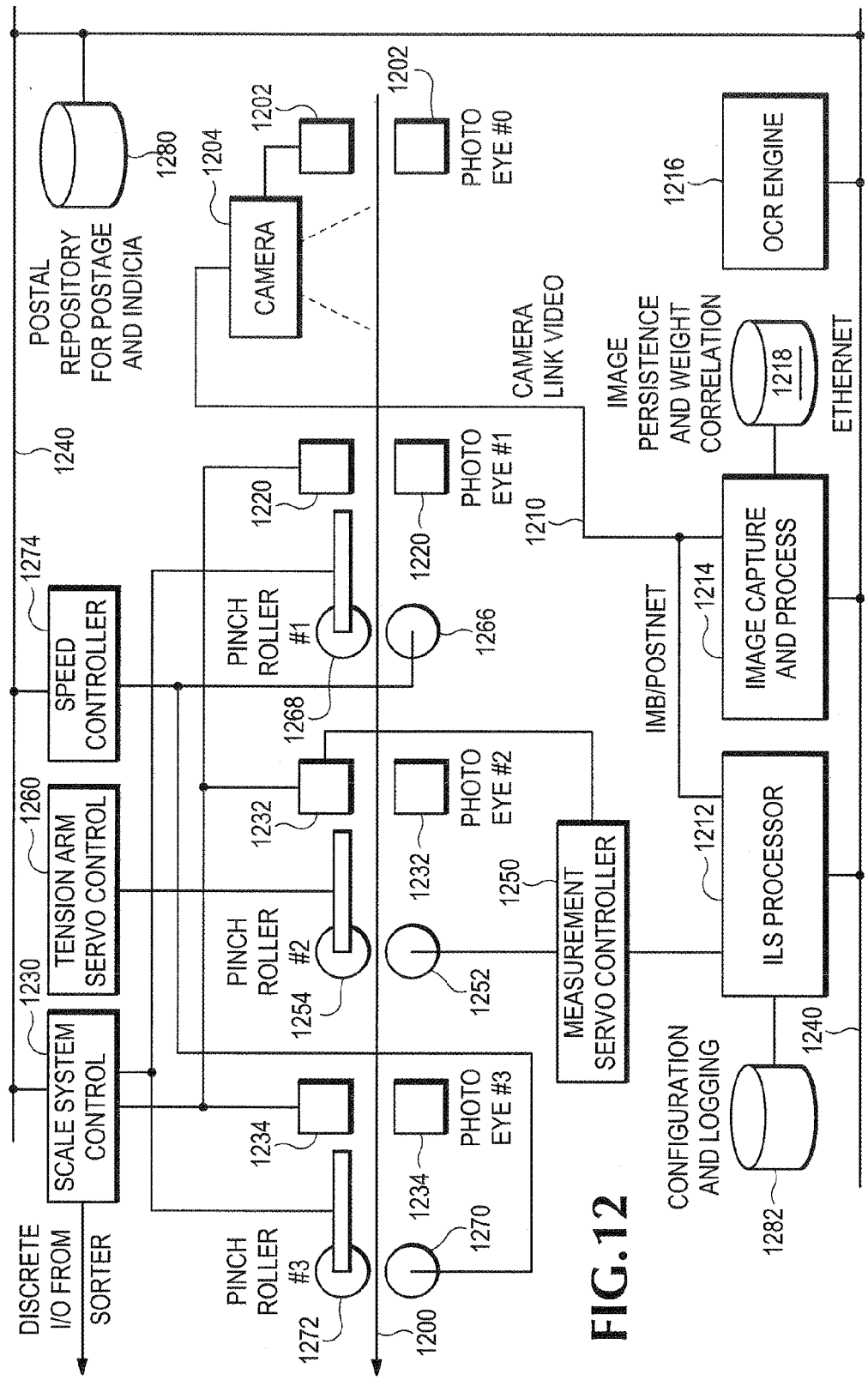
FIG. 12 is a simplified electronic system diagram of a dual-servo controlled in-line weighing apparatus in the context of a mail sorting system.

FIG. 12 is a simplified system diagram of a dual-servo controlled, in-line weighing apparatus in a postal sorting system. This is called "dual-servo" as a first servo loop controls a first servo motor for a weighing operation, and a second servo loop controls a second servo motor for gripping tension control during the same weighing operation. In the illustrated embodiment, a transport 1200, typically comprising moving belts, moves a stream of mail pieces from right to left in the drawing. Such transports may move the mail at speeds on the order of 10 ft./sec although the particular speed is not critical to this disclosure. We refer to this quantity as the "system speed" or "transport speed."

At the right or intake side of the drawing, a "PHOTO EYE #0" comprises a light source and a corresponding photo detector 1202, arranged to detect the arrival of an incoming mail piece (not shown) as the leading or front edge of the mail piece traverses the light beam. The resulting electrical signal can be used to trigger a camera 1204 to start a new image capture. The camera then uploads image data to an image capture and processing component 1214. This process preferably is implemented in software, and may be implemented in the ILS Processor 1212 in some embodiments. The image capture process 1214 stores the mail piece image data in a datastore 1218. In some embodiments, the system may be coupled to another database, e.g. an postal service ICS database, in which case the image data may be stored there. After weighing, the ILS Processor stores the determined weight of a piece in the database 1218 in association with the corresponding image data.

The image capture process 1214 may utilize an OCR engine (software) 1216 to extract or "read" a destination address, or at least ZIP code, from captured mail piece image. These components may communicate over a local network 1240, for example an Ethernet network. Destination address data also may be stored in 1218 in association with the item image or other identifying data. In an embodiment, ID Tag data from an ICS may be used as an identifier.

Another database 1280 stores data for a batch of mail to be weighed in the ILS. The database 1280 may include information about the mail pieces in the batch and the postage paid for mailing the pieces. The database 1280 may include data or a machine-readable "manifest" provided by a sender or pre-sort house. For example, it may have a list of the mail pieces in the batch. They may be listed individually, by destination address, destination postal code, or using an internal ID number. Or, there may simply be a listing of the numbers of items, in total, or per zip code range, or per individual zip code. Other variations may be provided by a mailer for its own internal purposes.

The database 1280 preferably includes postage information as well. This may be the actual amount of postage paid for each individual item, where individual items are listed. Alternatively, summary data may be used where mail pieces are grouped or aggregated such that a bunch of items have the same postage paid. The database 1280 may include mailer permit information, postage rates, discounts, etc. Using this information, the ILS Processor 1212 or another process can correlate the mail pieces reflected in the manifest in database 1280, with the weights of the corresponding pieces, stored at 1218. It can determine the appropriate postage for each piece, and compare the actual postage paid for the piece. The difference, if any, is owed to the postal service (assuming the subject mail piece is processed by the postal service). In some applications, this system may be used to correct the postage for a batch (or individual items) before submission to the postal service.

Next we proceed to the weighing operations. After the envelope passes by the camera 1204 (again, moving right to left in the drawing), a second photo detector pair ("PHOTO EYE #1) 1220 detects the leading edge entering the in-line scale or weighing region. The photo detector 1220 is coupled to a scale system controller 1230. A third photo detector pair 1232, and a fourth photo detector pair 1234 also are coupled to the scale system controller 1230. Operation of these devices is described below. The scale system controller 1230 may be connected by any suitable data network arrangement, such as an Ethernet network 1240, for communication and data transfers with other components as indicated in the drawing, and with the sorter system controller (not shown).

Figure 13:
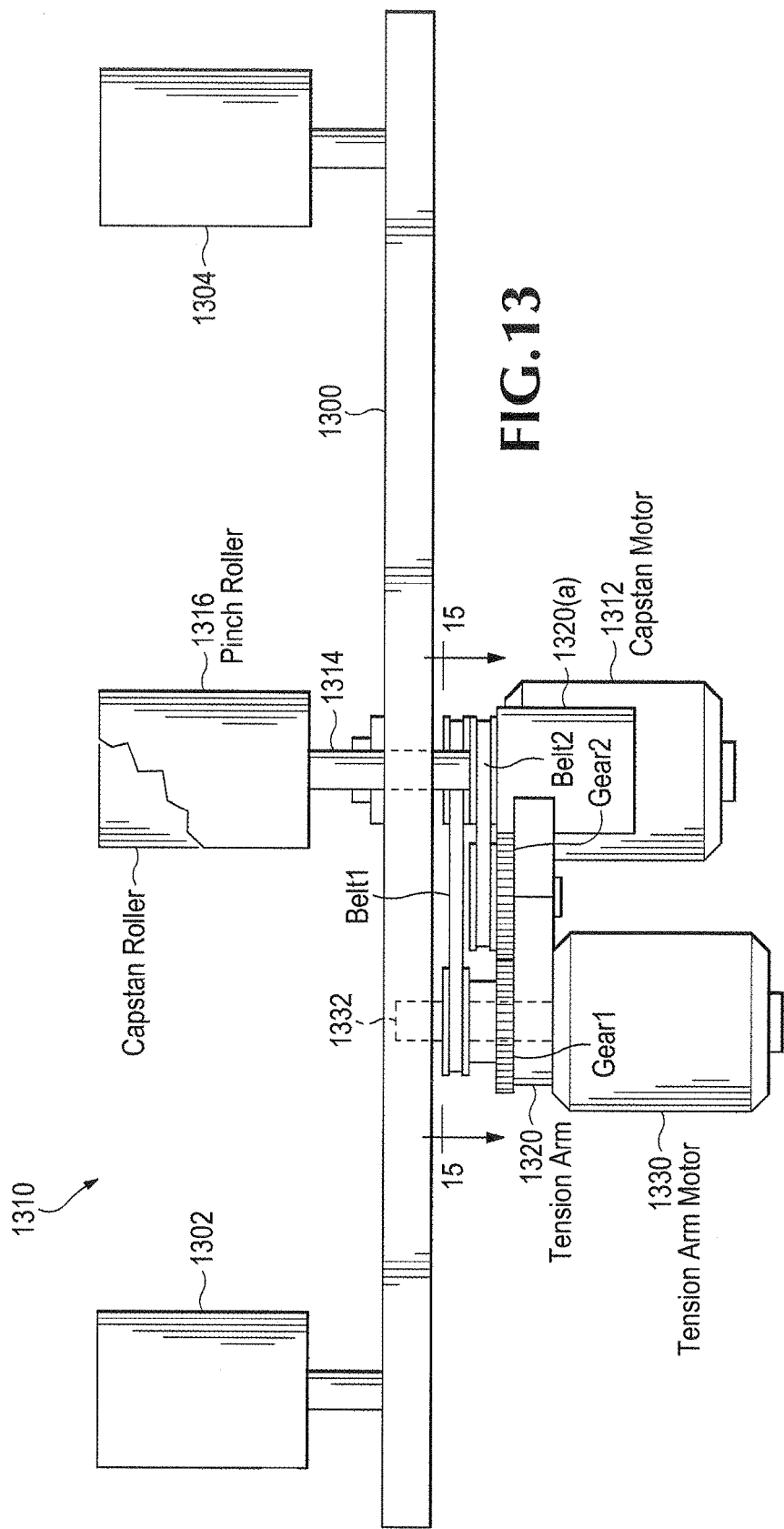
FIG. 13 is a side view of an embodiment of a dual-servo in-line weighing apparatus.

Referring again to FIG. 12, a first servo control system is driven by the measurement servo controller 1250. The photo detector 1232 is coupled to the measurement servo controller, as shown, to detect a mail piece entering the weigh station. In addition, the photo eye detects the trailing edge of the mail piece, which indicates that the piece has cleared the pinch roller #1 and therefore is ready for weighing. The measurement servo controller is coupled to a capstan motor 1252 for weighing operations. During a weighing operation, the mail piece is gripped between a capstan roller coupled to the capstan motor 1252, and an opposing pinch roller 1254. The pinch roller, in a preferred embodiment, is linked to the capstan roller to keep them synchronized. For example, in an embodiment, rather than a freewheeling pinch roller, the pinch roller 1254 opposing the capstan roller also is powered by the capstan servo motor 1252. FIG. 13 illustrates such an embodiment, further described below. This arrangement increases the available friction surface area and reduces roller slippage to improve weighing accuracy.

In addition, the weigh station pinch roller 1254 may be mounted on an active swing arm assembly, as distinguished from a traditional spring-loaded swing arm. Here, the swing arm is coupled to a tension arm servo controller 1260 which is arranged to present a constant force on each mail piece during weighing regardless of thickness. A passive spring system, by contrast, presents increased force (due to increased spring compression) on thicker mail pieces. One example of an active swing arm assembly is described below with regard to FIG. 13.

Two additional capstan and pinch roller assemblies provide speed normalization for mail pieces of varying length. A capstan 1266 and opposing pinch roller 1268 ensures that all mail pieces are presented to the measurement rollers in the weigh station at uniform velocity. Another capstan 1270 and opposing pinch roller 1272 restores each mail piece to the original transport speed. These capstans may be controlled by a speed controller 1274. These outboard pinch rollers may be controlled (opened and closed) by the scale system controller 1230.

The controller coordinates their actions, based on input from the photo detectors, to grip a mail piece in the weigh station assembly (1252, 1254), immediately after releasing it from the input side pinch roller assembly (1266, 1268) or at substantially the same time as the piece is released, so as to minimize slowdown. Preferably, the grip in the weigh station is fast and firm, so as to minimize slippage in the rollers. For example, the force applied may be on the order of two pounds force. In an embodiment, this gripping force is applied by the tension arm motor, under a precise servo control, and further described below. Slippage is also minimized by synchronized, active drive of the capstan roller and the pinch roller, rather than using a passive pinch roller. In another embodiment, a lesser gripping force may be applied. A system may be programmed to wait, for example on the order of 10 msec, to ensure that the piece has stopped slipping.

In one embodiment, the servo controller 1250 receives speed feedback from the capstan motor 1252, and drives the motor as programmed. For example, it may be arranged to accelerate or decelerate the mail piece by a predetermined amount. The servo loop must be fast and accurate enough to accelerate (and/or decelerate) a mail piece as commanded within a time frame that is practical for in-line applications. Suitable servo motors and amplifiers are described above. Preferably, weighing of one piece is done within approximately 40 msec. The motor torque profile acquired during that acceleration can be analyzed to determine weight of the mail piece. The acceleration produces a spike or impulse in motor torque that may be captured and analyzed to determine weight. By contrast, a constant velocity in this scale would not work.

In other embodiments, mentioned above, the servo system may not seek to accelerate or decelerate the piece to a new velocity. Rather, it may inject an impulse to maintain a zero weight state.

Figure 14:
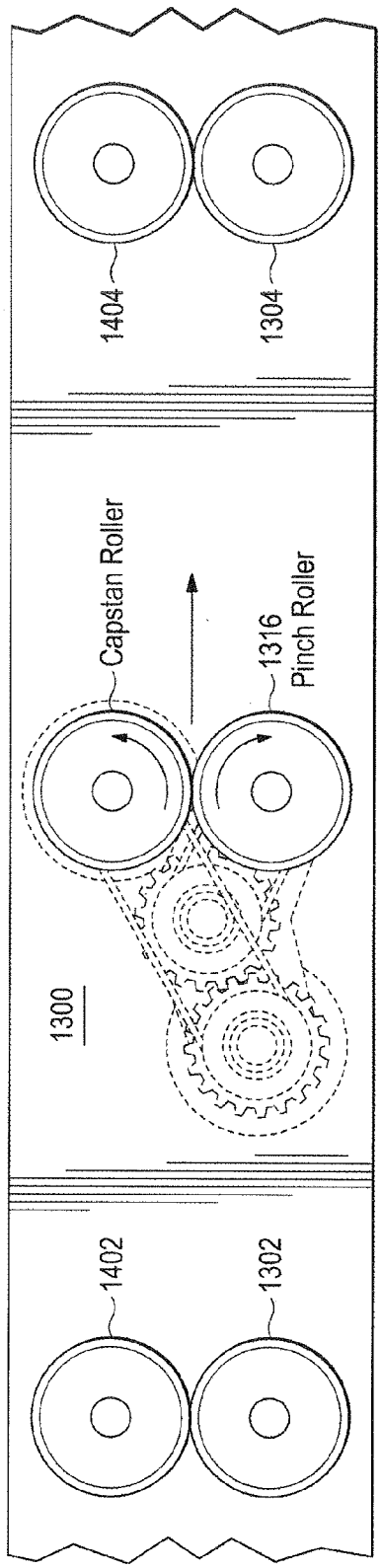
FIG. 14 is a top plan view the weighing apparatus of FIG. 13.

FIG. 13 is a side view of an embodiment of an in-line weighing apparatus, installed on a platform or deck 1300 made of a sturdy, rigid material such as steel. The deck may be, for example, on the order of 1.0 cm thick, but this dimension is not critical. The deck surface must be substantially flat and smooth so as to provide a surface for mail pieces to glide over it without significant friction. A first roller (intake roller) 1302 is part of a capstan (1402) and opposing pinch roller pair, better seen in FIG. 14 top view. This is an intake roller as a mail piece travels from left to right in the drawing, as indicated by the arrow 1400 in FIG. 14. A similar output roller 1304 is again part of a capstan (1404) and pinch roller pair as shown in FIG. 14 in top view.

In operation, the intake capstan 1402 operates (CCW) at the same speed as a belt-driven transport section, if the weighing apparatus is installed in a larger machine such as a sorter, to normalize the speed of a mail piece for pieces of different lengths. This enables all incoming pieces to enter the weighing assembly at the same speed. The actual or absolute value of that speed is not critical for present purposes. In contradistinction to prior art, this system does not rely on speed measurements.

Referring again to FIG. 13, a weighing assembly 1310 includes a Capstan Roller, driven by a Capstan Motor 1312, via a shaft 1318 (see FIG. 16) which passes through the deck 1300. All the rollers (1302, 1402, Capstan Roller, Pinch Roller 1316, 1304, and 1404 are located above the deck 1300 for conveying mail pieces (left to right) over the surface of the deck. The various motors, gears and belts, described below, preferably are located below the deck, leaving a clear path for the moving mail pieces. In another embodiment, the drive mechanics may be located above the deck.

Figure 15:
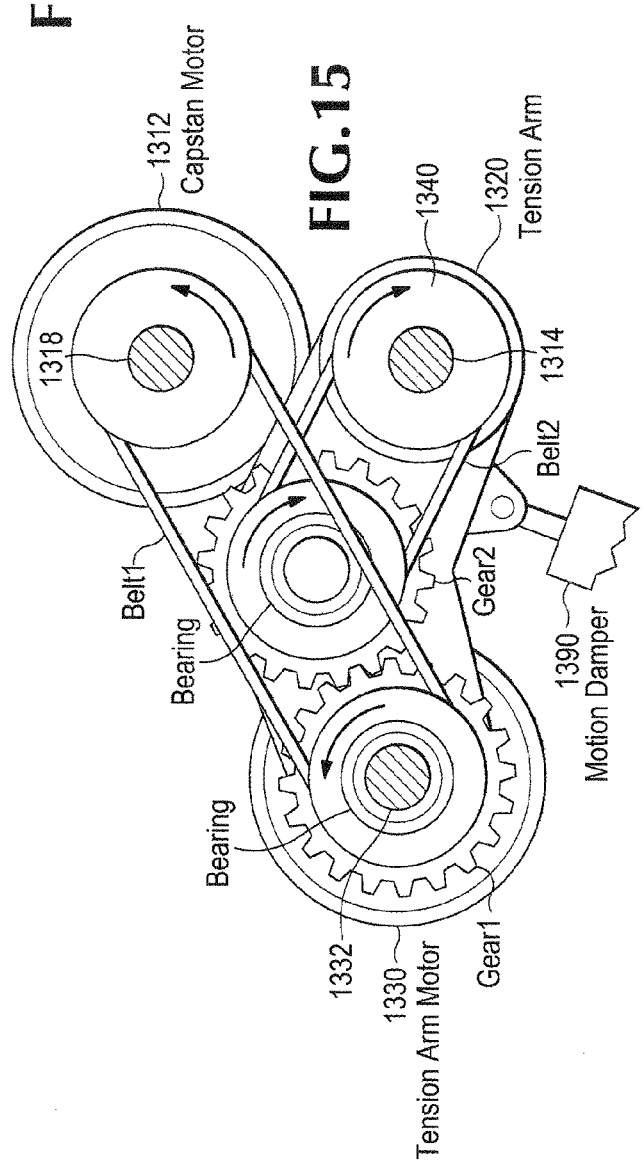
FIG. 15 is an enlarged top view taken along line 15-15 of FIG. 13 showing drive linkage detail of the weighing assembly of the weighing apparatus of FIG. 13.

Capstan Motor 1312 also indirectly drives an opposing Pinch Roller 1316 (see FIG. 14), so that the Capstan Roller and Pinch Roller are precisely synchronized. This minimizes roller slippage to improve weighing accuracy. Referring now to FIG. 15, the Capstan Motor 1312, shaft 1318, drives Belt1, which in turn is linked to the opposing Pinch Roller 1316 as follows. The Capstan Motor shaft 1318 (CCW) drives Belt1, which in turn drives an Gear1. Gear1 is mounted co-axially on a bearing on shaft 1332 of the tension arm motor 1330, so that Gear1 is free to rotate independently of the shaft 1332. An idler Gear2 is engaged with Gear1, so that rotation of Gear1 drives Gear2 clockwise, as indicated by arrows in the drawing. Force applied by the tension arm motor 1330 does not affect the operation of Gear1 or Gear 2. (The role of the tension arm motor is described below.) See also the perspective view in FIG. 16. Gear2, driven by Gear1 as noted, in turn is arranged to drive a Belt2 in CW rotation as shown in FIG. 15. Belt2 in turn is arranged to rotate a pulley 1340, which is mounted to a shaft 1314 to drive the Pinch Roller 1316.

Note the presence of a rigid tension arm 1320. The tension arm is mounted at one end on shaft 1332 of the tension arm motor 1330. The tension arm 1320 supports the idler Gear2 which is mounted on a bearing for free rotation. The other end of the tension arm, opposite the tension arm motor, comprises a generally cylindrical housing 1320(*a*), although the exact shape is not critical. Housing 1320(*a*) has a shaft 1314 rotatably mounted therein, for example in a bearing assembly (not shown). The shaft 1314 extends upward through the deck 1300 to drive the Pinch Roller. The shaft is driven by Belt2 by means of a pulley 1340 mounted on the shaft 1314. FIG. 16 is a perspective view of the weighting assembly 1310, showing the deck in phantom for clarity. FIG. 17 is a perspective view of the tension arm 1320 standing alone. This design is merely an example and not intended to be limiting.

In operation, the tension arm motor 1330 rotates the tension arm through a limited range on the order of approximately +/−10 degrees from a neutral or center setting. The exact range of motion is not critical. This rotation serves to adjust the position of the pinch roller 1316, as it is mounted to the tension arm as mentioned. An oblong slot 1315 in the deck accommodates this motion (see FIG. 16). Because the Capstan Roller is fixed in position relative to the deck, repositioning the Pinch Roller has the effect of adjusting the pinching force between the Capstan Roller and the opposing Pinch Roller, to keep it constant.

The tension arm motor 1330 preferably is driven by a precision servo control system, so that it provides a selected constant force on the Pinch Roller. This feature is distinguished from other systems in which pinch rollers generally are urged against the capstan roller by a spring. Springs provide a tension or force that varies with distance (compression of the spring). A spring therefore would cause the tension in a mail system to vary with the thickness of each mailpiece, interfering with weighing operations as described herein. The system described above provides a constant force for gripping a mail piece in the weighing apparatus independent of the thickness of the mail piece (within reasonable bounds). Note that tension arm servo controller data can be used to record mail piece thickness if desired.

In a preferred embodiment, a motion damper 1390 is fixed to the deck and arranged to apply a damping force to the tension arm to suppress vibration of the tension arm when it closes on a mail piece at high speed. The damper shaft and piston are connected to the tension arm. A tension arm motion damper may be commercially available Ace Controls, model MA 225 or similar.

In a preferred embodiment, a capstan motor may be a commercially available servo motor such as Teknic model M-2311P or similar. The capstan motor may be controlled using, for example, a servo amplifier such as Teknic model SST-E545-RCX-4-1-3 or similar. In these amplifiers, also called servo drives, a high-speed DSP control processor controls all of the feedback loops: position, velocity and actual torque. Torque is actively measured and controlled, with losses in the motor effectively minimized. The operation is substantially all-digital: the motor measurements are converted directly into digital format for the DSP and the outputs to the motor are digital PWM pulse streams. In alternative solutions, analog processing may be used, as long as the performance characteristics described herein are met.

The tension arm motor may be a commercially available servo motor such as Glentek model GMBM-40100-13-0000000 or similar (Glentek, El Segundo, Calif.). This too is a brushless AC servo motor. It provides a 100 W power rating, 3000 rpm rated speed, and has a peak stall torque of about nine lb-inches. It may be controlled with a servo amplifier such as Glentek—SMA9807-003-001-1A-1 or similar. In operation, the servo amplifier can provide output data, in analog or digital form, that indicates torque applied to the motor as a function of time.

In an embodiment, mail pieces travel into and leave the scale at a speed on the order of 13 feet/second (156 inches per second). As noted, the exact transport speed is not critical. In a preferred embodiment, the system can calculate weight of each piece in real time. That leaves about 70 msec available for each measurement. Within that time, a system may capture, for example, 128 sample measurements from the capstan servo motor amplifier. Weighing accuracy should be within a range of approximately +/−7 grams (0.25 ounce). Prototypes have demonstrated accuracy on the order of +/−4 grams (0.14 ounce).

Figure 8A:
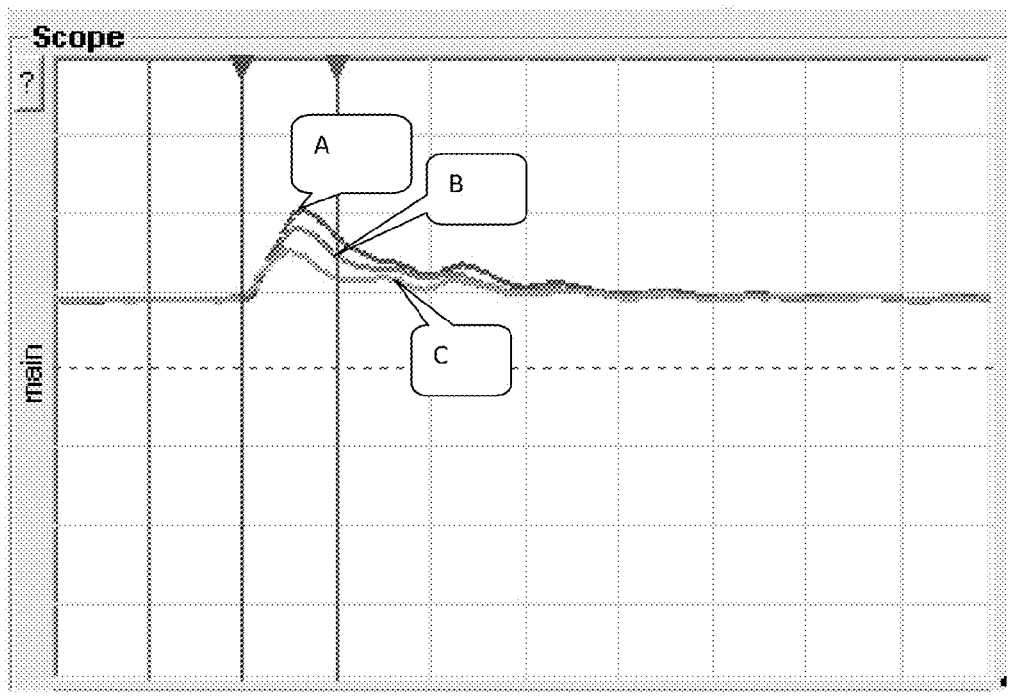
FIGS. 8A and 8B are oscilloscope traces of servo motor torque measurements taken in a development prototype weighing system in accordance with one aspect of the present invention.
Figure 8B:
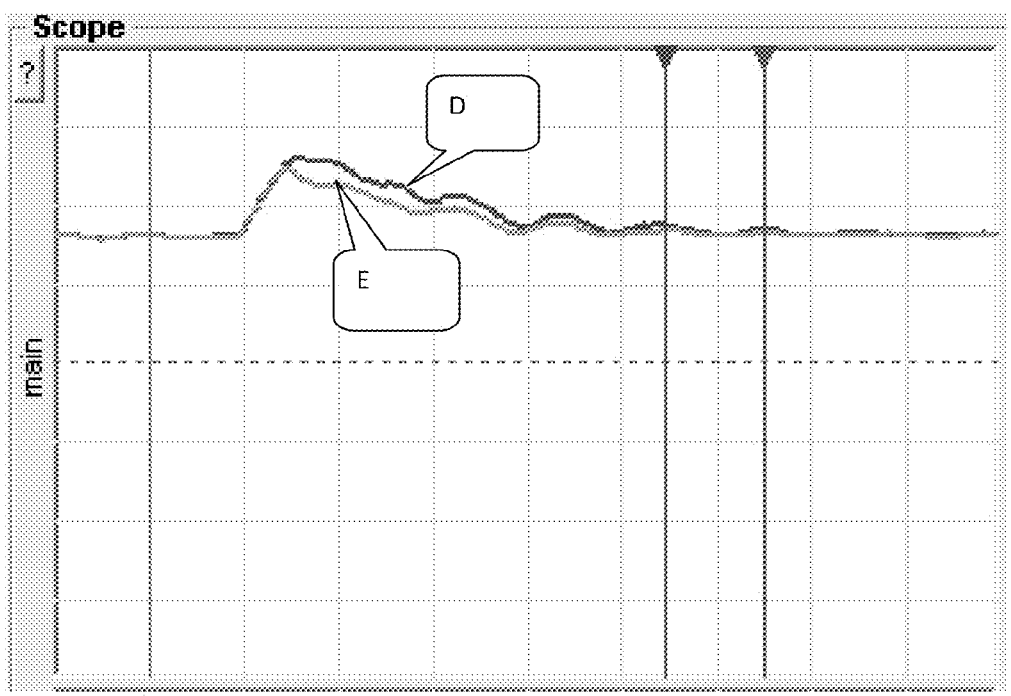

FIGS. 8A and 8B are oscilloscope traces of capstan servo motor torque measurements taken in a development prototype weighing system that implements aspects of the present invention. This data may be analyzed in various ways, for example using one or more suitably programmed digital processors. Preferably, a real-time system determines a weight of a mail piece from the corresponding servo amplifier data quickly enough that pieces can continue to move through the in-line scale at normal sorting system speeds. For example, 128 servo samples over 30 msec would require a data rate of around 4k samples/sec.

FIG. 8A depicts a 5 gram differential torque measurement from a weigh on the fly prototype. Trace "C" is 12 grams, "B" is 17 g and "A" is 22 g. Vertical scale is ounce-inches of servo motor torque and horizontal is time (on the order of 10 msec per division). The first vertical cursor on the left is the point at which the mail piece trips the photo eye for the center roller (weighing) system. The other cursors are not relevant. It is straightforward to calibrate the system by weighing mail pieces of known weights.

FIG. 8B shows traces of 2.5 gram differential. The "E" line is 14.5 g and trace "D" is 17 g. These waveforms are of slightly different shape from the previous image due to increased oscilloscope gain and different mechanical settings on the test bed transport. These traces show clear resolution even down to 2.5 grams. We believe this can be extended to considerably finer resolution while continuing to process at full speed (e.g. 40,000 pieces per hour).

In an embodiment, it is helpful to conduct a Fourier analysis on the torque waveform sample data. The discrete Fourier transform (DFT) may be used to reduce the data to a small number of values or coefficients. The DFT can be computed efficiently in practice using a fast Fourier transform (FFT) algorithm. By pre-computing the same analysis on known calibration pieces, the Fourier coefficients of interest may be stored, for example in a lookup table, to determine weights later during operation by comparison to the values in the table. This approach provides an effective way to compare the torque waveforms to provide accurate measurements. It also helps to filter out vibration and other system noise from the measurement data.

In one embodiment, an in-line scale system of the type described above may be deployed within or in tandem with automated mail handling equipment such as a destination bar code sorter machine (DBCS). On the bar code sorter system in this example, the transport belt speed is 153 ips. The capstan servo on the ILS runs at 250 ips tangential velocity. The shortest mail piece is 5 inches long, plus a 3.5 inch minimum gap between pieces. So at an incident speed of 153 ips, we have a measurement interval of approx 56 ms between pieces. This timing is illustrated in the upper trace of FIG. 18. The system therefore needs to complete all sampling and processing in this interval to operate in "real time".

Figure 18:
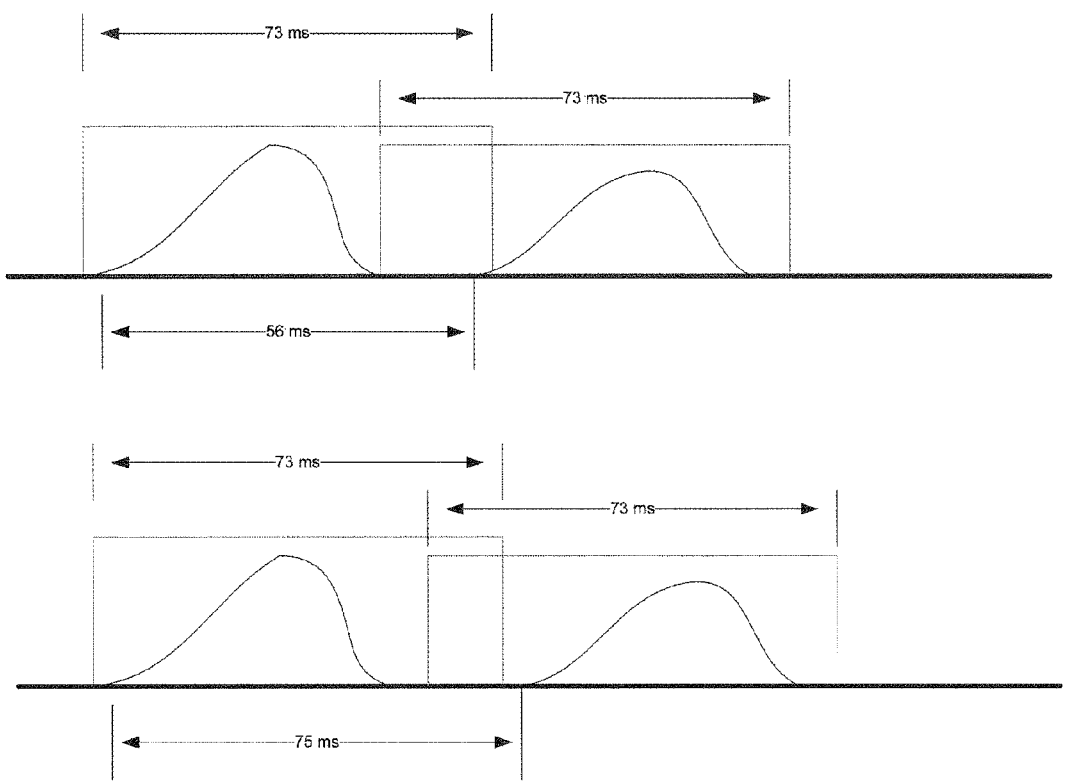
FIG. 18 shows sample measurement waveforms to illustrate an example of weighing "on the fly" at a typical bar code sorter system transport belt speed.

In a preferred embodiment, the system acquires 128 samples to the FFT, and the servo system described above samples at 1750 samples per second. This means that the sampling interval per piece is approx 73 ms. However, as noted, in the present example, only about 56 msec is available between pieces. One solution to this apparent dilemma is to simultaneously sample into 2 separate measurements that are offset in time. The system thus is multi-threaded. We center the torque impulse data for each piece in the 73 ms window so any data that appears in sequential measurements is where the servo is quiescent or between pieces. This is essentially the zero area. This overlap technique is illustrated in FIG. 18. In the top figure, the time between the leading edge of the impulses is 56 ms because the pieces are 5 inches long separated by 3.5 inches. In the bottom figure, the pieces are 8 inches long so the sampling overlap is smaller. The gaps is constant at 3.5 inches.

Other Embodiments and Variations

An alternative embodiment to the pinch roller system discussed above is above is to use a forced air column opposite the servo roller in place of the pinch roller. This approach has several potential advantages: The entry impulse will not be effected by thickness since there will be no pinch roller and swing arm to displace. Moreover, the force imposed by the air column will be constant and not variable with thickness.

The air column can be switched rapidly thereby allowing the torque measurement to be taken after the leading edge of the piece has passed. The air column could actually keep the servo roller clean. Yet another embodiment uses gravity to hold the article against the impulse-providing mechanism. It is preferred, however, to apply positive control of the article as explained above.

It is not necessary for the proposed invention that the impulse-providing device rotate. All that is necessary is that it provide an impulse to achieve an ordered final state of motion of the article, that the power (electrical or other) that provides the impulse be measured, and that the results be compared with the results of providing impulse to objects of known properties passing through the system.

It is not necessary for the proposed system that the impulse provided to the article be tangential to the article. It can, for example, be transverse. What matters is that the system has an initial state, a final state, and a method for measuring some stand-in indicative of the impulse that moves the object from its initial to its final state. It then must compare that measurement with the measurement of the stand-in required to change the state of one or more articles of known mass-related properties.

In one embodiment the mass-related property of the article is deduced by interpolating between the mass-related properties of calibration articles. This interpolation may be linear, polynomial, or any other method.

In another embodiment the article's mass-related property may be determined to be larger than or smaller than some threshold without determining either the article or the calibration object's actual mass-related property. Thus if an object of maximum mass were used for calibration, and if objects of mass greater than this maximum are to be routed from the system, it is sufficient to know whether or not the article to be measured is more massive than the calibration mass.

Postage Checking and Franking

Referring once again to the control system of FIG. 12, a mail processing system may include an in-line weighing apparatus, discussed above, and a datastore 1280 for storing postage information. Postage information may include postage rates, for pieces of various sizes, classes and weights. In an embodiment, a scale system may be configured to process a particular run or batch of mail, for example a batch of standard size letters. Discounts may be applicable for batches that meet certain volume and other requirements (e.g. pre-sorting). This configuration data may be stored at a configuration and logging datastore 1282 in the system of FIG. 12. The system can access appropriate postage rates from the datastore 1280, which may be coupled to a system network, e.g. Ethernet 1240.

In operation, a system of the type illustrated by FIG. 12 may weigh a mail piece, log the weight (1282), and check whether or not the correct postage has been paid for that piece. This may be done, for example, by the in-line scale processor 1212 consulting the postage data in repository 1280. The repository data may include various types of postage data. For example, it may store the postage per piece that was paid for a specific pre-sort batch of mail. The batch may be identified by any suitable means, for example, mailer ID, batch ID, date/time stamps, etc. For a pre-sort batch, a single postage amount may be paid per piece. The present system can check whether in fact each weighed piece has a weight within the limit for the amount paid per piece. Overweight (or "postage due") pieces may be logged and counted in order for the USPS to collect the shortfall from the mailer. Specific mailpieces may be identified for example using ID Tag numbers. Or just the number of postage due pieces may be tallied.

In another scenario, the postage paid for each specific mailpiece may be stored at 1280, and the system can verify whether or not the correct postage was paid for that piece. That test may involve weight, size, and other characteristics listed below. For example, the mail piece dimensions may be determined from the image capture and analysis components, or using photocells. Again, data may be logged, and postage-due pieces can be flagged in a database and or marked on the mail piece itself. Marking may be done by printing, spraying, etc. using known techniques. The postage-due marking may comprise a machine-readable indication for special handling.

Or the pieces may not be specially marked, but a report and invoice automatically generated to charge the mailer for the postage due. Or, the postal service can simply debit the mailer by credit card, ACH account, etc. Using aspects of the present invention, the USPS can collect revenues, otherwise lost, with a minimum of extra effort. Indeed, the collection process just described may be fully automated, with resulting increased revenues to the USPS estimated to be worth tens or even hundreds of millions of dollars.

The actual postage paid for mail pieces that are not in a pre-sort batch (called letterbox pieces) may be determined outside the system illustrated, for example by human visual inspection, and stored in datastore 1280 for checking. Or, the postage may be determined in a sorter or other automated handling system using an image capture system that captures and processes an image of the mail piece front side. This may be the same imaging system as that used for address recognition, or another one. In FIG. 12, a camera 1204 (bar code reader) is coupled via 1210 to an image capture system 1214. For example, datastore 1218 may store image data related to postage stamps or postage meter markings. The system may compare captured image data from the mail piece to the stored postage image data (indicia) to recognize the postage paid for the mail piece.

Methods for postage recognition include the following:
Postal stamp recognition by optical imaging and software recognition
Postal permit recognition by optical imaging and software recognition
Indicia recognition by hardware or software system e.g. 2-D barcode (IBI)
Barcode recognition with embedded weight specification and originator identification
Keyline recognition with embedded weight specification
The lookup and reference of a postal permit database with associated payment information One type of machine-readable imprint, approved by the USPS, is called IBI or Information-Based Indicia. IBI in one embodiment comprises a two-dimensional bar code printed with an embedded digital signature. The IBI imprint contains identifying information identifying the postage meter that made the imprint, and the postage paid. IBI is the combination of a machine-readable barcode and human readable information. The digital signature serves to authenticate that the information is not tampered with in any way.

To summarize, one aspect of the present invention comprises a system for measuring the weight of each mail piece in a stream of mail pieces, determining the proper postage for that mail piece, determining the amount of postage paid by the mailer, and segregating out mail pieces with improper postage. The proper amount of postage may be based on the mail piece's weight, size, thickness, mailing point, delivery point, or other property, alone or in combination. Another aspect of the invention comprises a method for ensuring that proper postage has been paid for each mail piece.

While the disclosed system is primarily aimed at determining which mail pieces have too little postage for their weight and other characteristics, it is within the purview of this disclosure to be able to audit and/or sort individual and sets of mail pieces based on any combination of the above attributes or others. For example, while postal authorities generally quantize their charges (for example charge X for letters up to 1 ounce, Y for letters weighing greater than one ounce and up to two ounces, etc.), it is within the purview of this invention to be able to audit and/or sort mail pieces by levels of attributes than may be more (or less) finely distinguished than the official categories.

The measured attribute(s) of the mail piece may include its weight (using a scale such as the in-line scale); its size or dimensions (measurable, for example, by a set of lights and photocells, the paths between some of which are interrupted for a period of time by the mail piece); its thickness (measurable, for example, by an offsetting pinch roller or laser thickness detector); its point of origination (determinable by the location of the initially-scanning mail sortation system or its return address; its intended destination (determinable from the delivery address on the mail piece); and others, either alone or in combination.

In one embodiment, the result of the process described above may include flagging out of compliance mail pieces for real time sortation to reject or overweight bin for return to sender or postage pending hold process. In another embodiment, as noted above, the mail piece may not be specially handled at all, but the postage due automatically charged to the sender. Audits of a mail stream may be produced and of individual mailers to determine the distribution of their mailing as to weight and as to whether they are overweight for the applied postage.

A high-speed franking machine may be used in combination with an in-line scale of the type disclosed above. By "high-speed" we mean a contrivance that can process mail pieces at normal transport speeds, for example on the order of 150 inches per second, or 40-60 thousand pieces per hour. This may be combined with the in-line scale to apply the correct postage to each piece, based on its weight, as the pieces move through automated handling in real-time. In this application, there is no need to check or verify postage, since the known correct postage is applied to each piece after weighing. Such a method and system may be used by senders (businesses or pre-sort houses) to ensure that correct postage is applied, and it can be done in combination with the a sorting process, by modification of a sorting machine. Just as an in-line scale can be deployed into a sorter, taking for example about 24 inches of linear transport space in typical application, so too the franking machine may be inserted following the scale on a single system. In other embodiments, a "scale plus franking machine" may be used separately to apply postage before sending a batch of mail to pre-sort.

Hardware and Software

Several examples have been described above with reference to the accompanying drawings. Various other examples of the invention are also possible and practical. The system may be exemplified in many different forms and should not be construed as being limited to the examples set forth above. The system described above can use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, aspects of the invention may be implemented in a digital computing system, for example a CPU or similar processor in a sorter system, in-line scale (standalone), or other embodiments. More specifically, by the term "digital computing system," we mean any system that includes at least one digital processor and associated memory, wherein the digital processor can execute instructions or "code" stored in that memory. (The memory may store data as well.)

A digital processor includes but is not limited to a microprocessor, multi-core processor, DSP (digital signal processor), GPU, processor array, network processor, etc. A digital processor (or many of them) may be embedded into an integrated circuit. In other arrangements, one or more processors may be deployed on a circuit board (motherboard, daughter board, rack blade, etc.). Aspects of the present invention may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example RAM or FLASH memory embedded in an integrated circuit CPU, network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, aspects of the present invention may be implemented or embodied in computer software (also known as a "computer program" or "code"; we use these terms interchangeably). Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system as broadly defined above. Such media may be any available media that is locally and/or remotely accessible by a computer or processor, and it includes both volatile and non-volatile media, removable and non-removable media, embedded or discrete.

It will be obvious to those having skill in the art that many changes may be made to the details of the above-described embodiments without departing from the underlying principles of the invention. The scope of the present invention should, therefore, be determined only by the following claims.

The invention claimed is:

1. A weighing station for an in-line scale comprising:
(a) a capstan motor comprising a first precision servo motor;
(b) a capstan roller operative coupled to the capstan motor;
(c) a pinch roller linked to the capstan motor for rotation in synchrony with the capstan roller;
(d) a tension arm motor comprising a second precision servo motor coupled to the pinch roller for controllably repositioning the pinch roller relative to the capstan roller so as to provide a gripping force for controllably gripping an article between the pinch roller and the capstan roller;
(e) a rigid tension arm coupled to the tension arm motor and supporting the pinch roller so as to allow free rotation of the pinch roller responsive to the capstan motor, the tension arm arranged for translating rotational force of the tension arm motor into forcing the pinch roller toward the capstan roller to provide said gripping force; and
(f) a motion damper coupled to the tension arm to suppress vibration of the tension arm when it closes on an article at high speed;
and further comprising:
a first servo amplifier electronically coupled to the capstan motor and arranged to drive the capstan motor to a selected speed of rotation while an article is gripped between the capstan roller and the pinch roller, and to acquire torque data from the capstan motor; and
a second servo amplifier electronically coupled to the tension arm motor and arranged to drive the tension arm motor to apply a selected constant force to the pinch roller while an article is gripped between the capstan roller and the pinch roller, thereby minimizing slippage of the article during weighing and avoiding weighing inaccuracy resulting from variations in thickness of the article.

2. A weighing station according to claim 1 and further comprising:
a controller coupled to the first servo amplifier and arranged to detect when an article enters the weighing station, and to acquire motor torque data from the first servo amplifier representing torque applied to the capstan motor during a period when the article is gripped between the capstan roller and the pinch roller; and wherein
the controller is programmable for processing the acquired motor torque data to determine a weight of the article.

3. A weighing station according to claim 2 and further wherein the controller is programmed to determine the weight of the article by applying a Fourier analysis of the acquired motor torque data and comparing the results of the analysis to previously stored Fourier calibration data.

4. A weighing station for an in-line scale according to claim 2 wherein the controller coupled to the first servo amplifier is configured to acquire two streams of motor torque sample data from the servo amplifier, the sample streams overlapping but offset in time.

5. A method comprising:
receiving a moving article between a pinch roller and a capstan roller, the article moving at an initial speed;
linking the pinch roller to the capstan roller for rotation in synchrony with the capstan roller so that the moving article continues to move while gripped between the pinch roller and the capstan roller substantially without slippage;

providing a first precision servo motor arranged for controllably driving the capstan roller so as to accelerate or decelerate the moving article to a commanded speed different from the initial speed;

acquiring torque data associated with the first precision servo motor while driving the capstan motor;

repositioning the pinch roller relative to the capstan roller so as to provide a gripping force for gripping the article between the pinch roller and the capstan roller while the article continues to move; and processing the acquired torque data to determine a weight of the moving article without stopping the article;

and further comprising providing a second precision servo motor arranged for repositioning the pinch roller and maintaining the gripping force independent of changes in thickness of the moving article.

* * * * *